(12) United States Patent
Chandrashekar

(10) Patent No.: US 12,294,894 B2
(45) Date of Patent: May 6, 2025

(54) CONFIGURATION SELECTION ENHANCEMENTS FOR LAYER 1/LAYER 2 TRIGGERED MOBILITY

(71) Applicant: Rakuten Symphony, Inc., Tokyo (JP)

(72) Inventor: Subramanya Chandrashekar, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/022,823

(22) PCT Filed: Feb. 14, 2023

(86) PCT No.: PCT/US2023/062538
§ 371 (c)(1),
(2) Date: Feb. 23, 2023

(87) PCT Pub. No.: WO2024/086383
PCT Pub. Date: Apr. 25, 2024

(65) Prior Publication Data
US 2024/0224128 A1    Jul. 4, 2024

(30) Foreign Application Priority Data
Oct. 21, 2022  (IN) .............. 202221060195

(51) Int. Cl.
  H04W 36/00  (2009.01)
  H04W 16/28  (2009.01)
  H04W 36/04  (2009.01)
  H04W 56/00  (2009.01)

(52) U.S. Cl.
  CPC ....... *H04W 36/0016* (2013.01); *H04W 16/28* (2013.01); *H04W 36/04* (2013.01); *H04W 56/0045* (2013.01)

(58) Field of Classification Search
  None
  See application file for complete search history.

(56) References Cited

U.S. PATENT DOCUMENTS

2023/0422123 A1* 12/2023 Zhang ................ H04W 36/18
2024/0349131 A1* 10/2024 Zhou ................. H04W 36/0061

OTHER PUBLICATIONS

International Search Report dated Jul. 12, 2023 in Appln No. PCT/US2023/062538.
Written Opinion of the International Searching Authority dated Jul. 12, 2023 in Appln No. PCT/US2023/062538.
(Continued)

*Primary Examiner* — Anh Ngoc M Nguyen
(74) *Attorney, Agent, or Firm* — Sughrue Mion, PLLC

(57) ABSTRACT

In general, the current subject matter relates to configuration selection enhancements for layer 1/layer 2 (L1/L2) triggered mobility (LTM). In some implementations, configuration selection enhancements for LTM can include receiving, at a centralized unit control plane (CU-CP) of a base station from a first distributed unit (DU) of the base station, data relevant to prepare a LTM handover (HO) configuration of at least one service for a user equipment (UE), and can include, after receiving the data, requesting, by the CU-CP, a second DU to prepare, considering the data, at least one LTM target cell configuration for the HO of the at least one service for the UE.

19 Claims, 22 Drawing Sheets

(56) References Cited

OTHER PUBLICATIONS

3GPP TS 38.300, 3rd Generation Partnership Project, Technical Specification Group Radio Access Network, NR, NR and NG-RAN Overall Description, Stage 2 (Release 17), Dec. 2022.

MediaTek Inc., RP-221799 (was RP-221558), "Revised WID on Further NR mobility enhancements," 3GPP TSG RAN Meeting #96, Electronic Meeting, Jun. 6-9, 2022.

MediaTek, RP-213565, "New WID on Further NR mobility enhancements," 3GPP TSG RAN Meeting #94e, Electronic Meeting, Dec. 6-17, 2021.

* cited by examiner

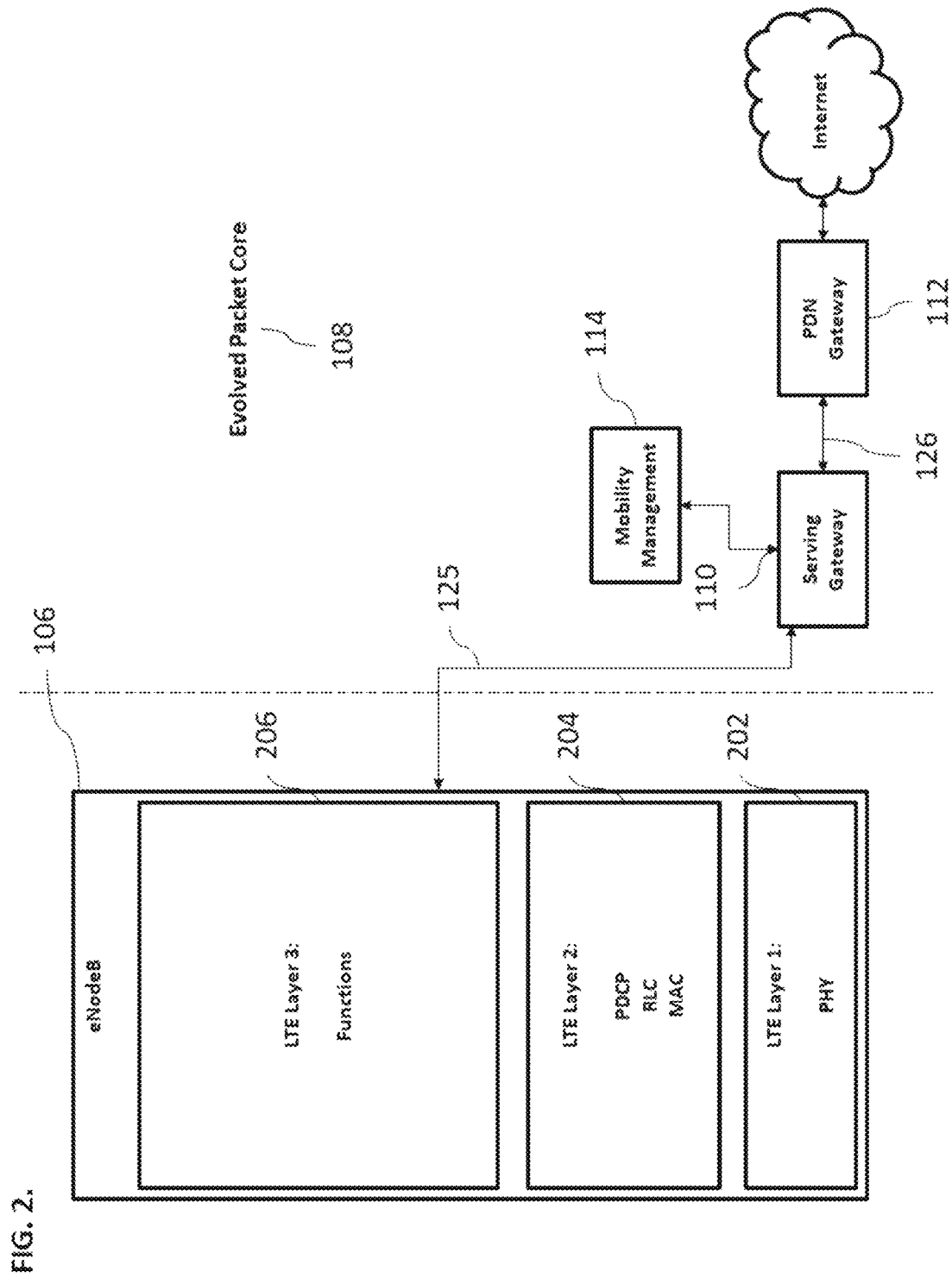

CONFIGURATION SELECTION ENHANCEMENTS FOR LAYER 1/LAYER 2 TRIGGERED MOBILITY

CROSS REFERENCE TO RELATED APPLICATIONS

The present application claims priority to and is the 35 U.S.C. § 371 United States National Phase application based on International Patent Application No. PCT/US23/62538, filed Feb. 14, 2023, and entitled "CONFIGURATION SELECTION ENHANCEMENTS FOR LAYER 1/LAYER 2 TRIGGERED MOBILITY" which claims priority to Indian Patent Application No. 202221060195 entitled "Method and system for configuration selection enhancements for Lower Layer Mobility" filed Oct. 21, 2022, which are hereby incorporated by reference in their entireties.

TECHNICAL FIELD

In some implementations, the current subject matter relates to telecommunications systems, and in particular, to configuration selection enhancements for layer 1/layer 2 (L1/L2) triggered mobility (LTM).

BACKGROUND

In today's world, cellular networks provide on-demand communications capabilities to individuals and business entities. Typically, a cellular network is a wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if the mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately M mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G standard is currently being developed and deployed. 3GPP cellular technologies like LTE and 5G NR are evolutions of earlier generation 3GPP technologies like the GSM/EDGE and UMTS/HSPA digital cellular technologies and allows for increasing capacity and speed by using a different radio interface together with core network improvements.

Cellular networks can be divided into radio access networks and core networks. The radio access network (RAN) can include network functions that can handle radio layer communications processing. The core network can include network functions that can handle higher layer communications, e.g., internet protocol (IP), transport layer and applications layer. In some cases, the RAN functions can be split into baseband unit functions and the radio unit functions, where a radio unit connected to a baseband unit via a fronthaul network, for example, can be responsible for lower layer processing of a radio physical layer while a baseband unit can be responsible for the higher layer radio protocols, e.g., MAC, RLC, etc.

A base station for a 5G cellular network can include a centralized unit (CU), one or more distributed units (DUs) communicatively coupled to the CU, and one or more radio units (RUs) each communicatively coupled to at least one of the one or more DUs and each configured to be communicatively coupled to one or more mobile phones and/or other user equipments (UEs). The CU can be logically split into a control plane portion (CU-CP) and one or more user plane portions (CU-UP). During the course of a UE's communicative coupling with the base station, the DU supporting the UE may change. In layer 1/layer 2 (L1/L2) triggered mobility (LTM) and multiple transmission and reception point (mTRP), configuration preparation for a handover from a serving cell to a target cell is always performed by the CU-CP and the execution is performed by the DU. This means that the CU-CP needs to be able to decide at a given time instant, what configuration to request from the DU. In the existing methods there is a lack of awareness of configuration details at the CU, which makes it impossible for the CU-CP to select the required configuration from the target cell at the DU.

SUMMARY

In some implementations, the current subject matter relates to a computer-implemented method. The method can include receiving, at a centralized unit control plane (CU-CP) of a base station from a first distributed unit (DU) of the base station, data relevant to prepare a layer 1/layer 2 triggered mobility (LTM) handover (HO) configuration of at least one service for a user equipment (UE). The method can also include, after receiving the data, requesting, by the CU-CP, a second DU of the base station to prepare, considering the data, at least one LTM target cell configuration for the HO of the at least one service for the UE.

The method may allow for configuration selection enhancements for LTM at a DU and for the CU-CP to be aware of the DU's situation and of what configuration is likely to succeed at the DU.

In some implementations, the current subject matter can include one or more of the following optional features.

In some implementations, the data can include timing advance information for each of a plurality of cells of the DU. Further, the CU-CP can receive the data in a procedure setting up an F1 communication interface between the CU-CP and the first DU, and/or the CU-CP can receive the data in an F1 Setup Request message transmitted from the first DU to the CU-CP; or the timing advance information can include average timing advance information for a given reference signal received power (RSRP) value for each of a plurality of beams or beam-groups of a plurality of cells of the second DU, and the CU-CP can receive the average timing advance information from the first DU prior to the CU-CP receiving a message from the first DU that a service change is needed for the UE, and/or the CU-CP can receive the data periodically in a non-UE associated procedure between the CU-CP and the second DU.

In some implementations, the receiving can include the CU-CP periodically receiving the data from the first DU prior to the CU-CP receiving a message from the first DU that a service change is needed for the UE, and the method can also include framing, at the CU-CP and using machine learning, a HO policy based at least in part on the received data. Further, the data can include data regarding of at least one of: a type of the UE, a speed of the UE, at least one service accessed at the first DU by the UE, and dynamic switching between a first cell and a second cell; and/or the method can also include receiving, at the CU-CP from the first DU currently serving the UE for the at least one service, performance data regarding the first DU's service to the UE, and the requesting can request the second DU to prepare the at least one LTM target cell also considering the data received from the first DU.

In some implementations, the first DU can includes at least one cell, the data can include resource availability of the at least one cell, and the receiving can include the CU-CP periodically receiving the resource availability from the first DU prior to the CU-CP receiving a message from the first DU currently serving the UE for the at least one service that a service change is needed for the UE; and/or the resource availability can include availability at each of the at least one cells for inter cell beam management (ICBM), dynamic switching, multiple transmission and reception point (mTRP), and LTM serving cell change (SCC).

In some implementations, the requesting can include transmitting, from the CU-CP to the second DU, an indication of target cell configuration being at least one of ICBM, dynamic switching, and LTM SCC.

In some implementations, the CU-CP can receive the data from the first DU prior to the CU-CP receiving a message from the first DU currently serving the UE for the at least one service that a service change is needed for the UE.

In some implementations, the method can also include selecting, at the CU-CP, a target cell configuration based at least in part on the received data.

In some implementations, the base station can have a disaggregated architecture.

In some implementations, the base station can include a Next Generation Radio Access network (NG-RAN) node that includes a gNodeB or an ng-eNodeB.

In some implementations, the base station can include at least one processor and can include at least one non-transitory storage media storing instructions that, when executed by the at least one processor, cause the at least one processor to perform the method.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

FIG. 2 illustrates further detail of an evolved Node B shown in FIGS. 1a-d;

DETAILED DESCRIPTION

The current subject matter can provide for systems and methods that can be implemented in wireless communications systems. Such systems can include various wireless communications systems, including 5G New Radio communications systems, long term evolution communication systems, etc.

In general, the current subject matter relates to configuration selection enhancements for layer 1/layer 2 (L1/L2) triggered mobility (LTM).

Traditionally, in order to support L1/L2 centric inter-cell change (e.g., change of a serving cell) in a disaggregated gNB architecture, configuration takes place at the gNB-CU-CP but cannot be executed autonomously by the gNB-DU without further interaction with the upper layers. In LTM, and also in multiple transmission and reception point (mTRP), configuration preparation for a handover from a serving cell to a target cell is always performed by the CU-CP and the execution is performed by the DU. This means that the CU-CP needs to be able to decide at a given time instant, what configuration to request from the DU. In the existing methods there is a lack of awareness of configuration details at the CU, which makes it impossible for the CU-CP to select the required configuration from the target cell at the DU. Configuration selection enhancements for LTM as described herein may allow for configuration selection enhancements for LTM at a DU and for the CU-CP to be aware of the DU's situation and of what configuration is likely to succeed at the DU.

Standards of 3GPP and/or standards of the O-RAN Alliance may be related to one or more aspects of the current subject matter.

One or more aspects of the current subject matter can be incorporated into transmitter and/or receiver components of base stations (e.g., gNodeBs, eNodeBs, etc.) in such communications systems. The following is a general discussion of long-term evolution communications systems and 5G New Radio communication systems.

I. Long Term Evolution Communications System

FIGS. 1a-c and 2 illustrate an exemplary conventional long-term evolution ("LTE") communication system 100 along with its various components. An LTE system or a 4G LTE, as it is commercially known, is governed by a standard for wireless communication of high-speed data for mobile telephones and data terminals. The standard is an evolution of the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard was developed by the 3GPP ("3rd Generation Partnership Project").

Figure 1A:
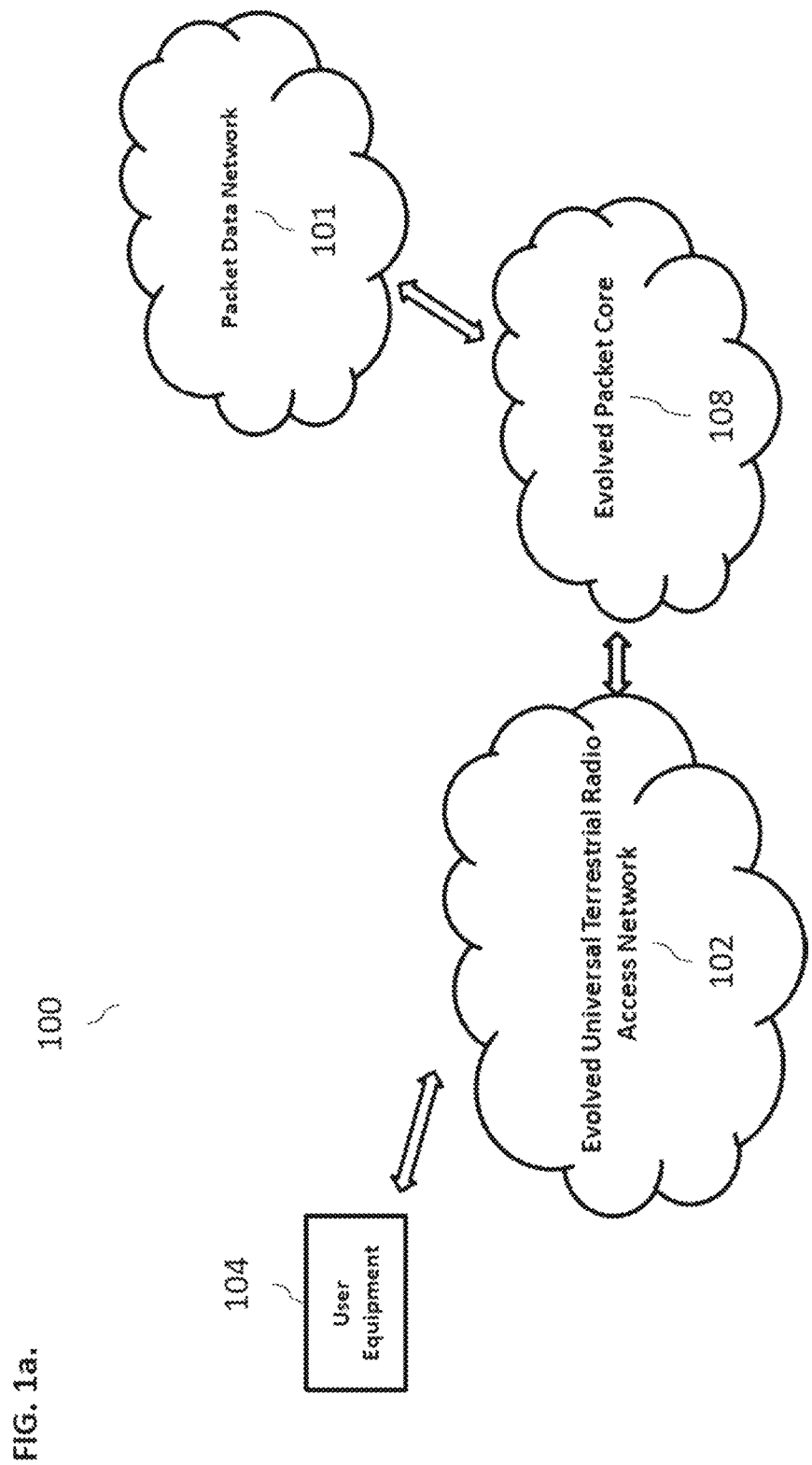
FIG. 1a illustrates an exemplary conventional long term evolution ("LTE") communications system.

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. Tb) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1B:
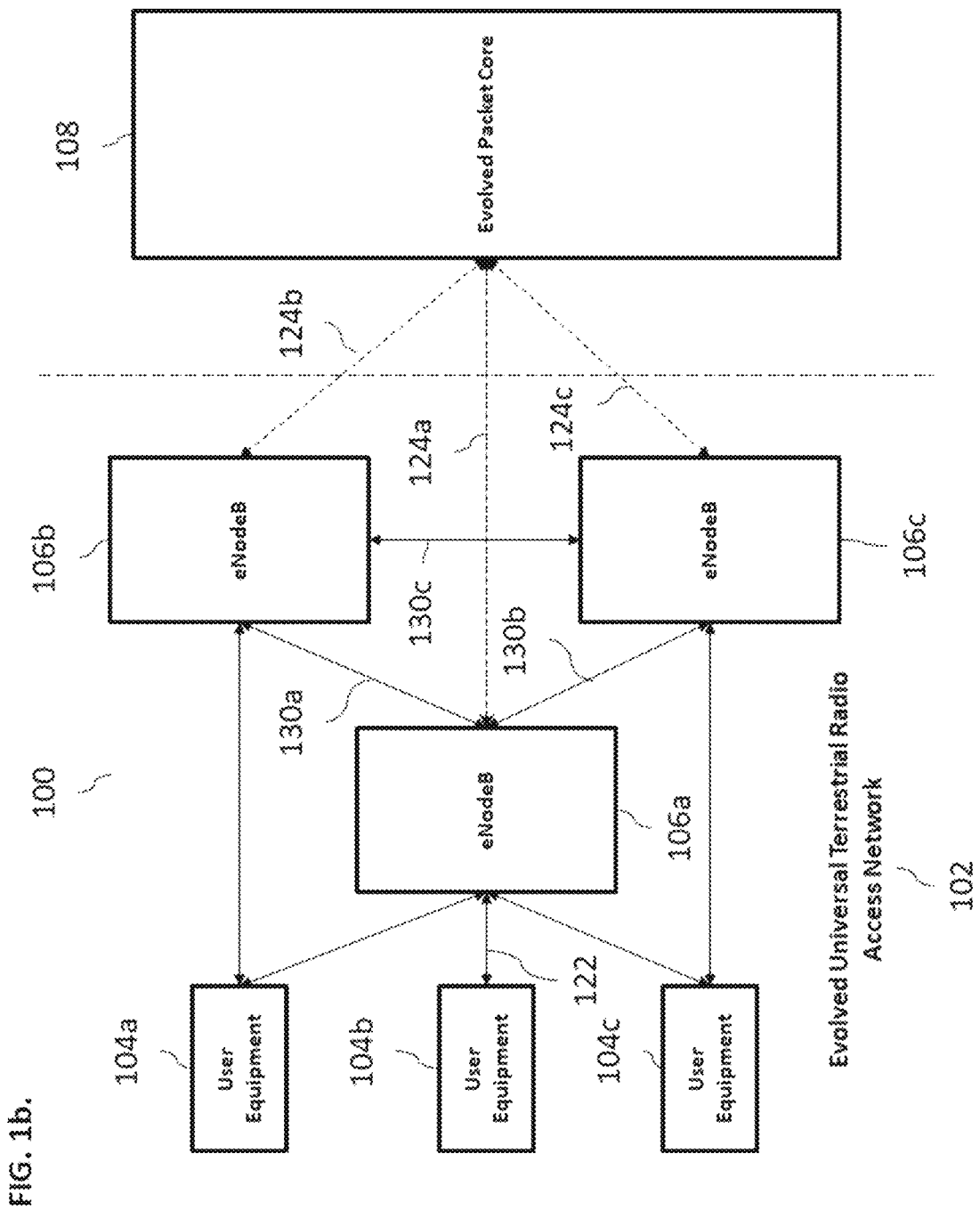
Figure 1C:
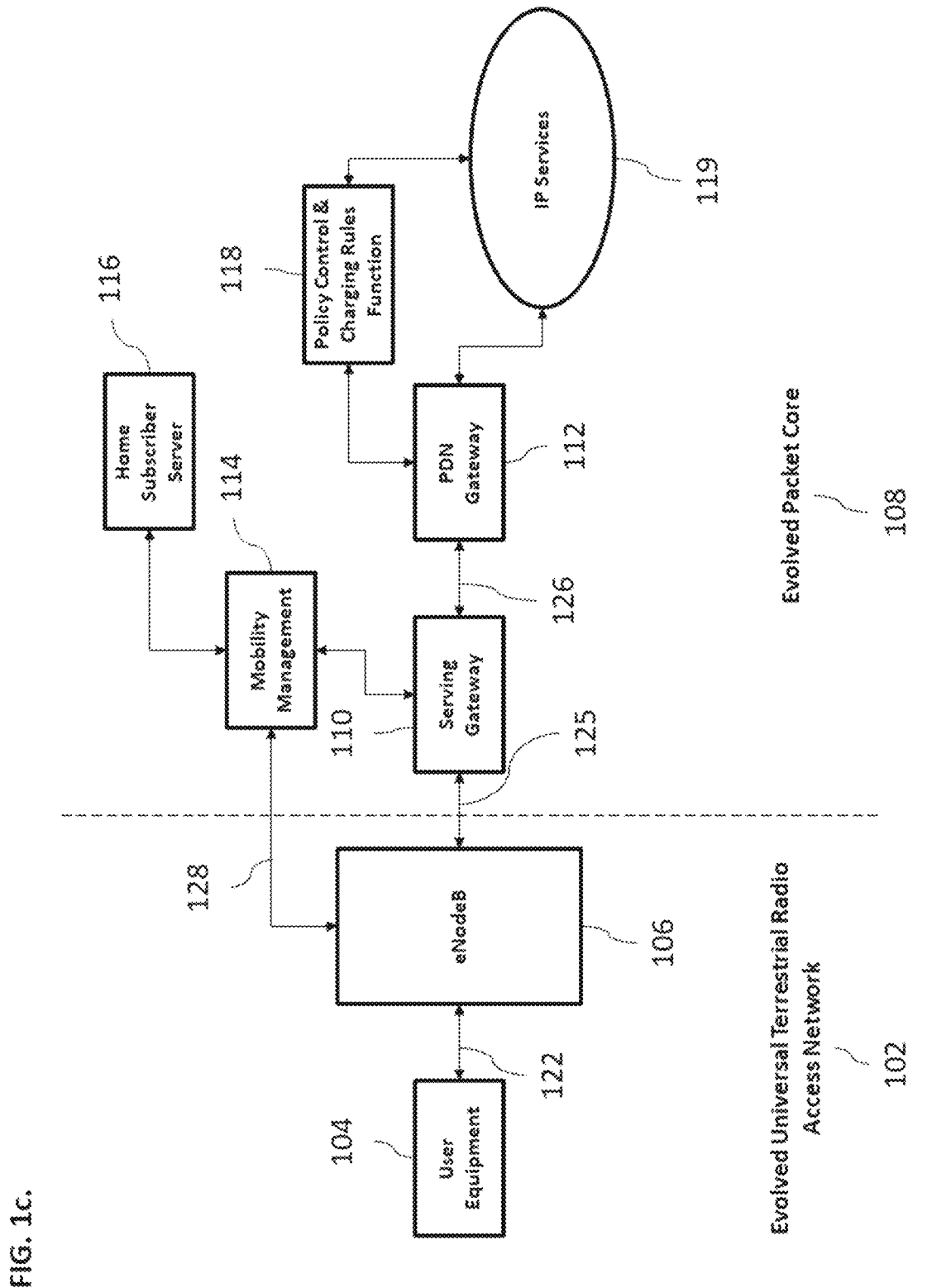

FIG. 1b illustrates further detail of the network 100 shown in FIG. Ta. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. Tb, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1b, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to inter-work with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QoS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1a).

Figure 1D:
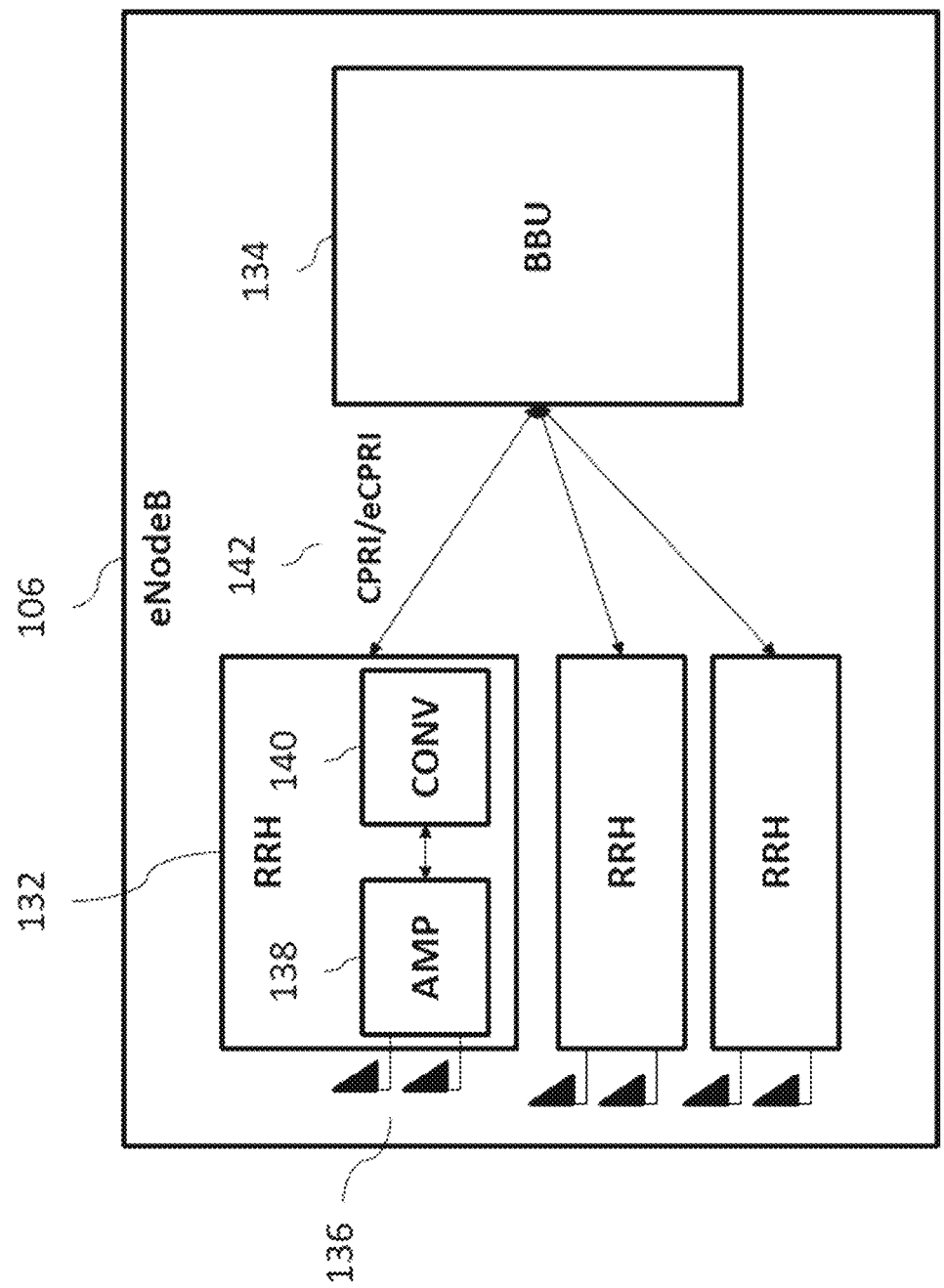

FIG. 1d illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI")/enhanced CPRI ("eCPRI") 142 standard specification either using RRH specific custom control and user plane framing methods or using O-RAN Alliance compliant Control and User plane framing methods. The operation of the eNodeB 106 can be characterized using the following standard parameters (and specifications): radio frequency band (Band4, Band9, Band17, etc.), bandwidth (5, 10, 15, 20 MHz), access scheme (downlink: OFDMA; uplink: SC-OFDMA), antenna technology (Single user and multi user MIMO; Uplink: Single user and multi user MIMO), number of sectors (6 maximum), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1d) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1d). Conversely, the RF signals that are received from user equipment 104 are amplified (using AMP 138) and converted (using CONV 140) to digital baseband signals for transmission to the BBU 134.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1d, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the ST-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

II. 5G NR Wireless Communications Networks

In some implementations, the current subject matter relates to a 5G new radio ("NR") communications system. The 5G NR is a next telecommunications standard beyond the 4G/IMT-Advanced standards. 5G networks offer a higher capacity than current 4G, allow higher number of mobile broadband users per area unit, and allow consumption of higher and/or unlimited data quantities in gigabyte per month and user. This can allow users to stream high-definition media many hours per day using mobile devices, even when it is not possible to do so with Wi-Fi networks. 5G networks have an improved support of device-to-device communication, lower cost, lower latency than 4G equipment and lower battery consumption, etc. Such networks have data rates of tens of megabits per second for a large number of users, data rates of 100 Mb/s for metropolitan areas, 1 Gb/s simultaneously to users within a confined area (e.g., office floor), a large number of simultaneous connections for wireless sensor networks, an enhanced spectral efficiency, improved coverage, enhanced signaling efficiency, 1-10 ms latency, reduced latency compared to existing systems.

Figure 3:
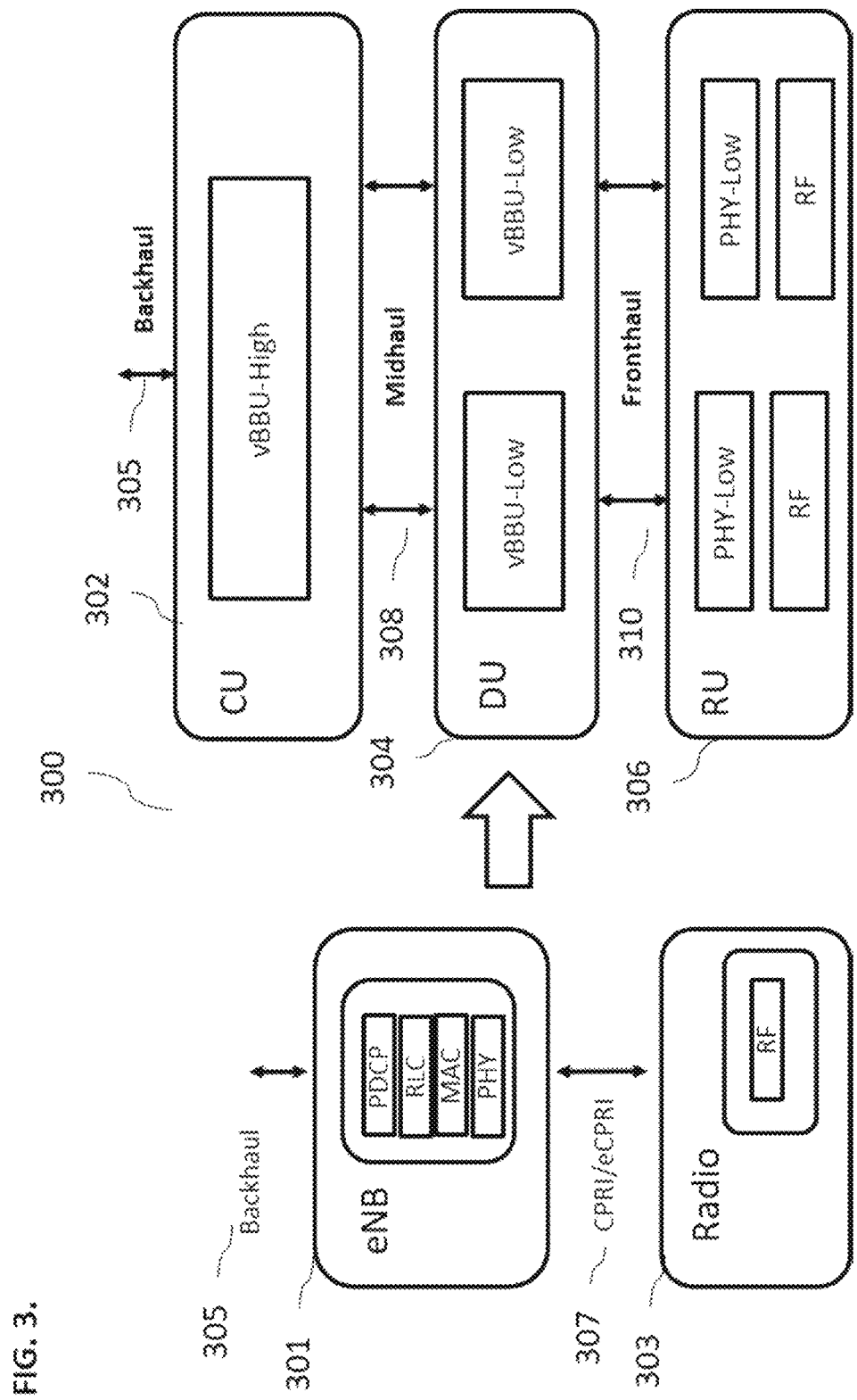
FIG. 3 illustrates an exemplary virtual radio access network, according to some implementations of the current subject matter.

FIG. 3 illustrates an exemplary virtual radio access network 300. The network 300 can provide communications between various components, including a base station (e.g., eNodeB, gNodeB) 301, a radio equipment 303, a centralized unit 302, a digital unit 304, and a radio device 306. The components in the system 300 can be communicatively coupled to a core using a backhaul link 305. A centralized unit ("CU") 302 can be communicatively coupled to a distributed unit ("DU") 304 using a midhaul connection 308. The radio frequency ("RU") components 306 can be communicatively coupled to the DU 304 using a fronthaul connection 310.

In some implementations, the CU 302 can provide intelligent communication capabilities to one or more DU units 304. The units 302, 304 can include one or more base stations, macro base stations, micro base stations, remote radio heads, etc. and/or any combination thereof.

In lower layer split architecture environment, a CPRI bandwidth requirement for NR can be 100s of Gb/s. CPRI compression can be implemented in the DU and RU (as shown in FIG. 3). In 5G communications systems, compressed CPRI over Ethernet frame is referred to as eCPRI and is the recommended fronthaul network. The architecture can allow for standardization of fronthaul/midhaul, which can include a higher layer split (e.g., Option 2 or Option 3-1 (Upper/Lower RLC split architecture)) and fronthaul with L1-split architecture (Option 7).

In some implementations, the lower layer-split architecture (e.g., Option 7) can include a receiver in the uplink, joint processing across multiple transmission points (TPs) for both DL/UL, and transport bandwidth and latency requirements for ease of deployment. Further, the current subject matter's lower layer-split architecture can include a split between cell-level and user-level processing, which can include cell-level processing in remote unit ("RU") and user-level processing in DU. Further, using the current subject matter's lower layer-split architecture, frequency-domain samples can be transported via Ethernet fronthaul, where the frequency-domain samples can be compressed for reduced fronthaul bandwidth.

Figure 4:
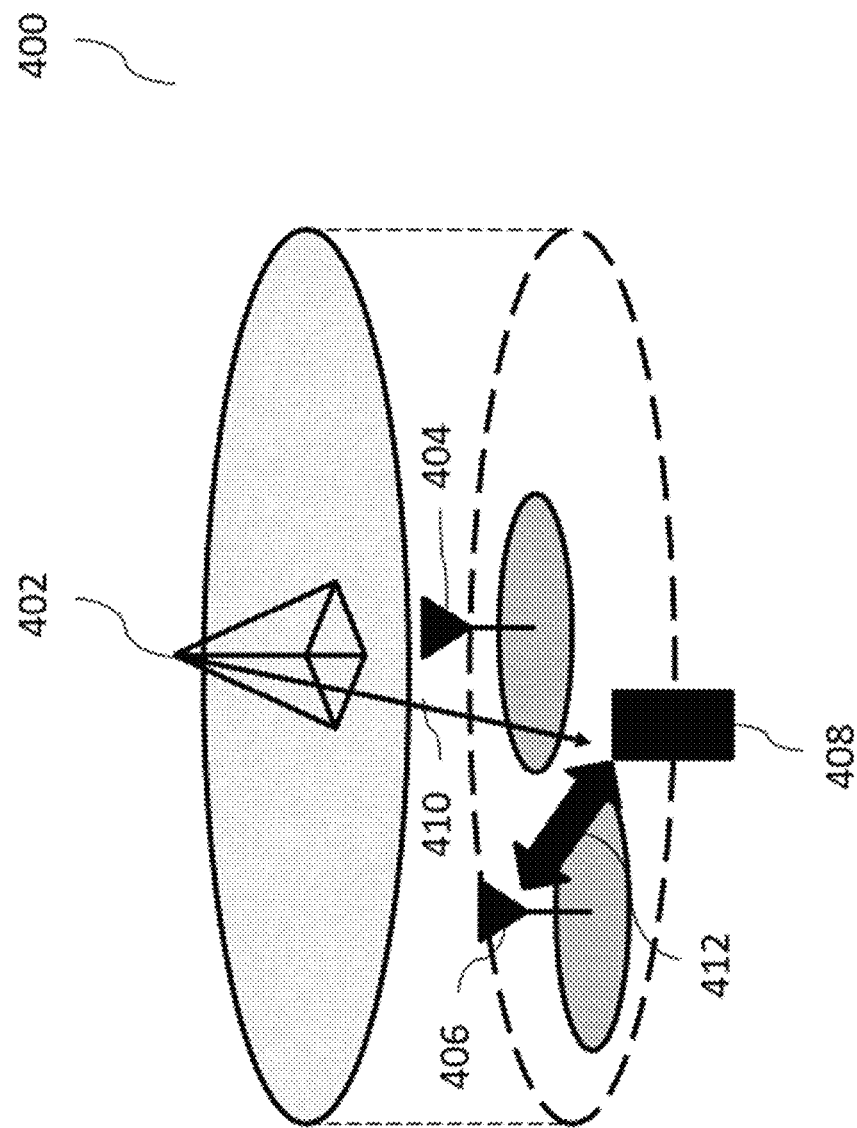
FIG. 4 illustrates an exemplary 3GPP split architecture to provide its users with use of higher frequency bands.

FIG. 4 illustrates an exemplary communications system 400 that can implement a 5G technology and can provide its users with use of higher frequency bands (e.g., greater than 10 GHz). The system 400 can include a macro cell 402 and small cells 404, 406.

A mobile device 408 can be configured to communicate with one or more of the small cells 404, 406. The system 400 can allow splitting of control planes (C-plane) and user planes (U-plane) between the macro cell 402 and small cells 404, 406, where the C-plane and U-plane are utilizing different frequency bands. In particular, the small cells 404, 406 can be configured to utilize higher frequency bands when communicating with the mobile device 408. The macro cell 402 can utilize existing cellular bands for C-plane communications. The mobile device 408 can be communicatively coupled via U-plane 412, where the small cell (e.g., small cell 406) can provide higher data rate and more flexible/cost/energy efficient operations. The macro cell 402, via C-plane 410, can maintain good connectivity and mobility. Further, in some cases, LTE and NR can be transmitted on the same frequency.

Figure 5A:
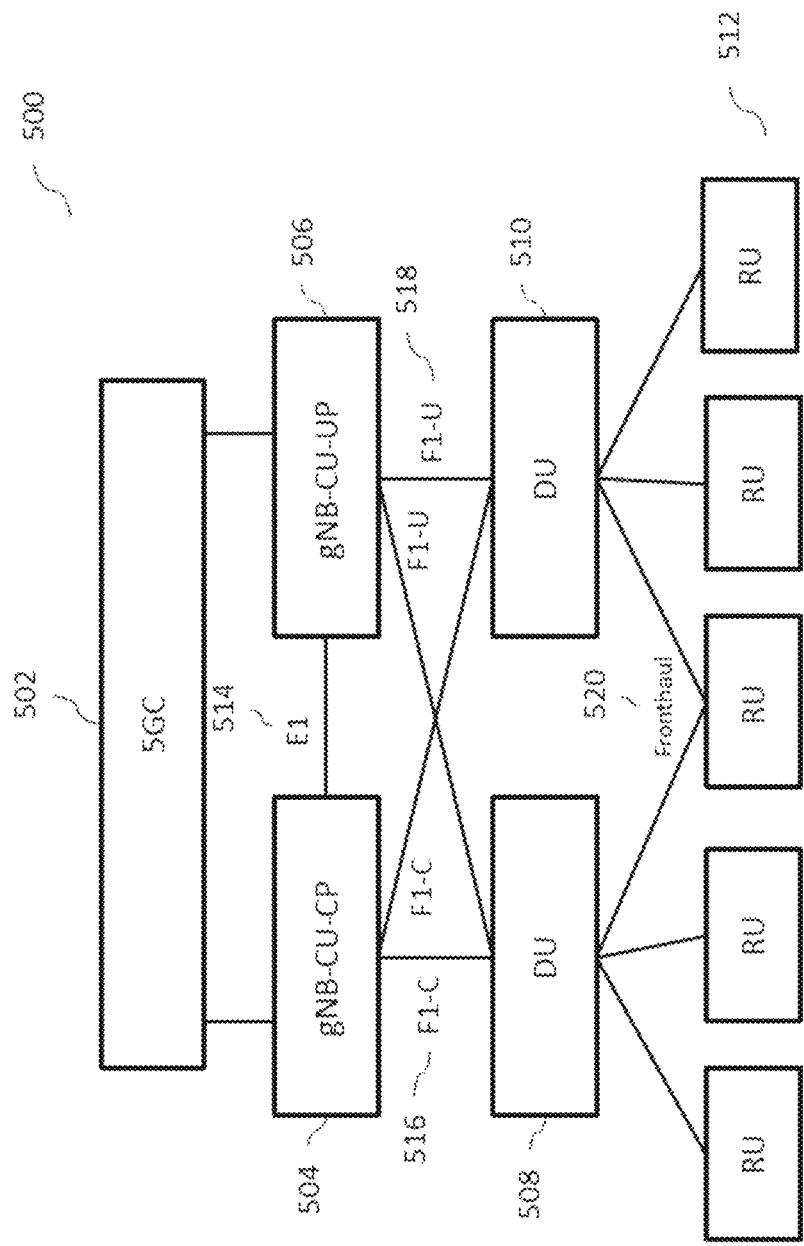
FIG. 5a illustrates an exemplary 5G wireless communication system.

FIG. 5a illustrates an exemplary 5G wireless communication system 500, according to some implementations of the current subject matter. The system 500 can be configured to have a lower layer split architecture in accordance with Option 7-2. The system 500 can include a core network 502 (e.g., 5G Core) and one or more gNodeBs (or gNBs), where the gNBs can have a centralized unit gNB-CU. The gNB-CU can be logically split into control plane portion, gNB-CU-CP, 504 and one or more user plane portions, gNB-CU-UP, 506. The control plane portion 504 and the user plane portion 506 can be configured to be communicatively coupled using an E1 communication interface 514 (as specified in the 3GPP Standard). The control plane portion 504 can be configured to be responsible for execution of the RRC and PDCP protocols of the radio stack.

The control plane and user plane portions 504, 506 of the centralized unit of the gNB can be configured to be communicatively coupled to one or more distributed units (DU) 508, 510, in accordance with the higher layer split architecture. The distributed units 508, 510 can be configured to execute RLC, MAC and upper part of PHY layers protocols of the radio stack. The control plane portion 504 can be configured to be communicatively coupled to the distributed units 508, 510 using F1-C communication interfaces 516, and the user plane portions 506 can be configured to be communicatively coupled to the distributed units 508, 510 using F1-U communication interfaces 518. The distributed units 508, 510 can be coupled to one or more remote radio units (RU) 512 via a fronthaul network 520 (which may include one or switches, links, etc.), which in turn communicate with one or more user equipment (not shown in FIG. 5a). The remote radio units 512 can be configured to execute a lower part of the PHY layer protocols as well as provide antenna capabilities to the remote units for communication with user equipments (similar to the discussion above in connection with FIGS. 1a-2).

Figure 5B:
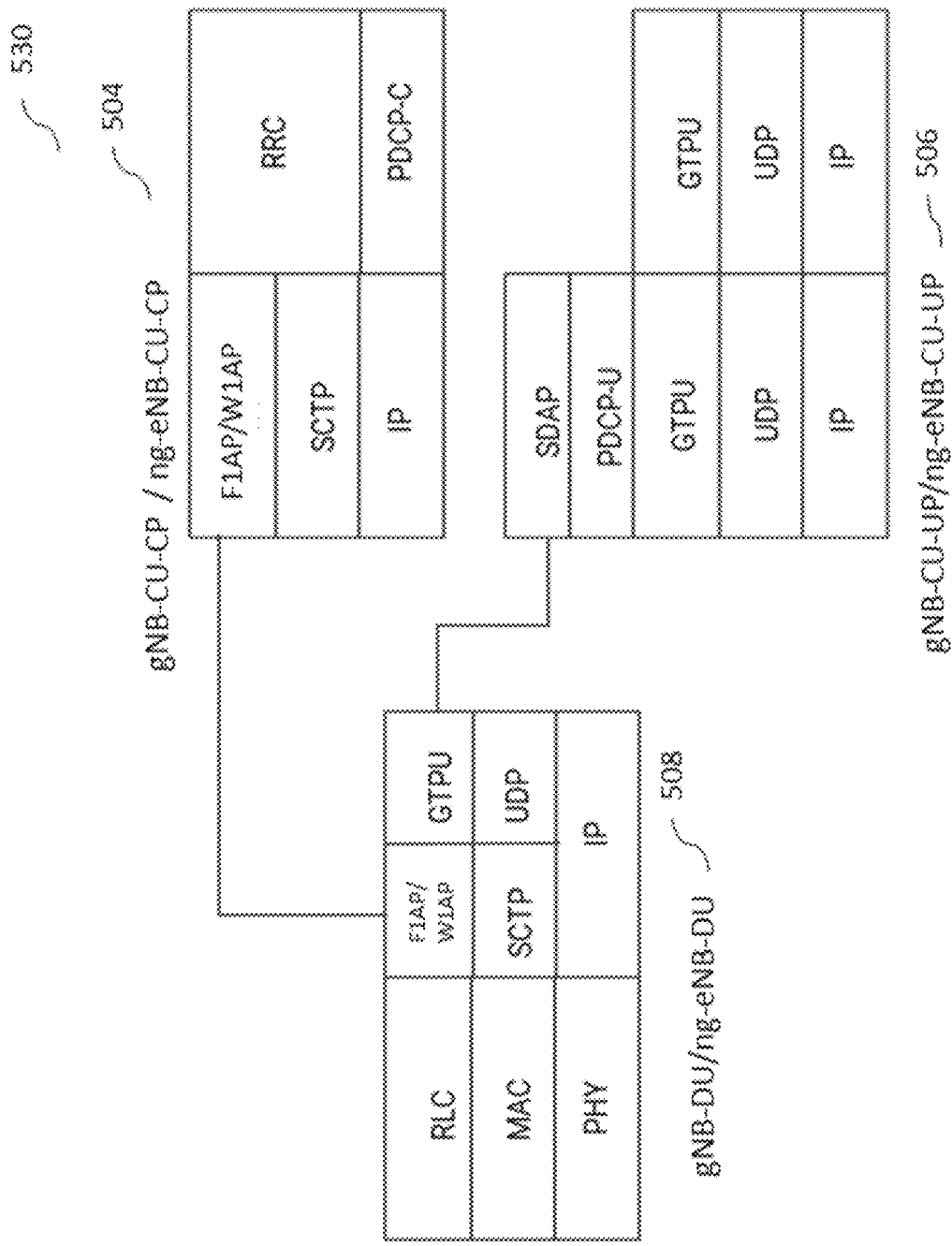
FIG. 5b illustrates an exemplary layer architecture of the split gNB and/or a split ng-eNB (e.g., next generation eNB that may be connected to 5GC)

FIG. 5b illustrates an exemplary layer architecture 530 of the split gNB. The architecture 530 can be implemented in the communications system 500 shown in FIG. 5a, which can be configured as a virtualized disaggregated radio access network (RAN) architecture, whereby layers L1, L2, L3 and radio processing can be virtualized and disaggregated in the centralized unit(s), distributed unit(s) and radio unit(s). As shown in FIG. 5b, the gNB-DU 508 can be communicatively coupled to the gNB-CU-CP control plane portion 504 (also shown in FIG. 5a) and gNB-CU-UP user plane portion 506. Each of components 504, 506, 508 can be configured to include one or more layers.

The gNB-DU 508 can include RLC, MAC, and PHY layers as well as various communications sublayers. These can include an F1 application protocol (F1-AP) sublayer, a GPRS tunneling protocol (GTPU) sublayer, a stream control transmission protocol (SCTP) sublayer, a user datagram protocol (UDP) sublayer and an internet protocol (IP) sublayer. As stated above, the distributed unit 508 may be communicatively coupled to the control plane portion 504 of the centralized unit, which may also include F1-AP, SCTP, and IP sublayers as well as radio resource control, and PDCP-control (PDCP-C) sublayers. Moreover, the distributed unit 508 may also be communicatively coupled to the user plane portion 506 of the centralized unit of the gNB. The user plane portion 506 may include service data adaptation protocol (SDAP), PDCP-user (PDCP-U), GTPU, UDP, and IP sublayers.

Figure 5C:
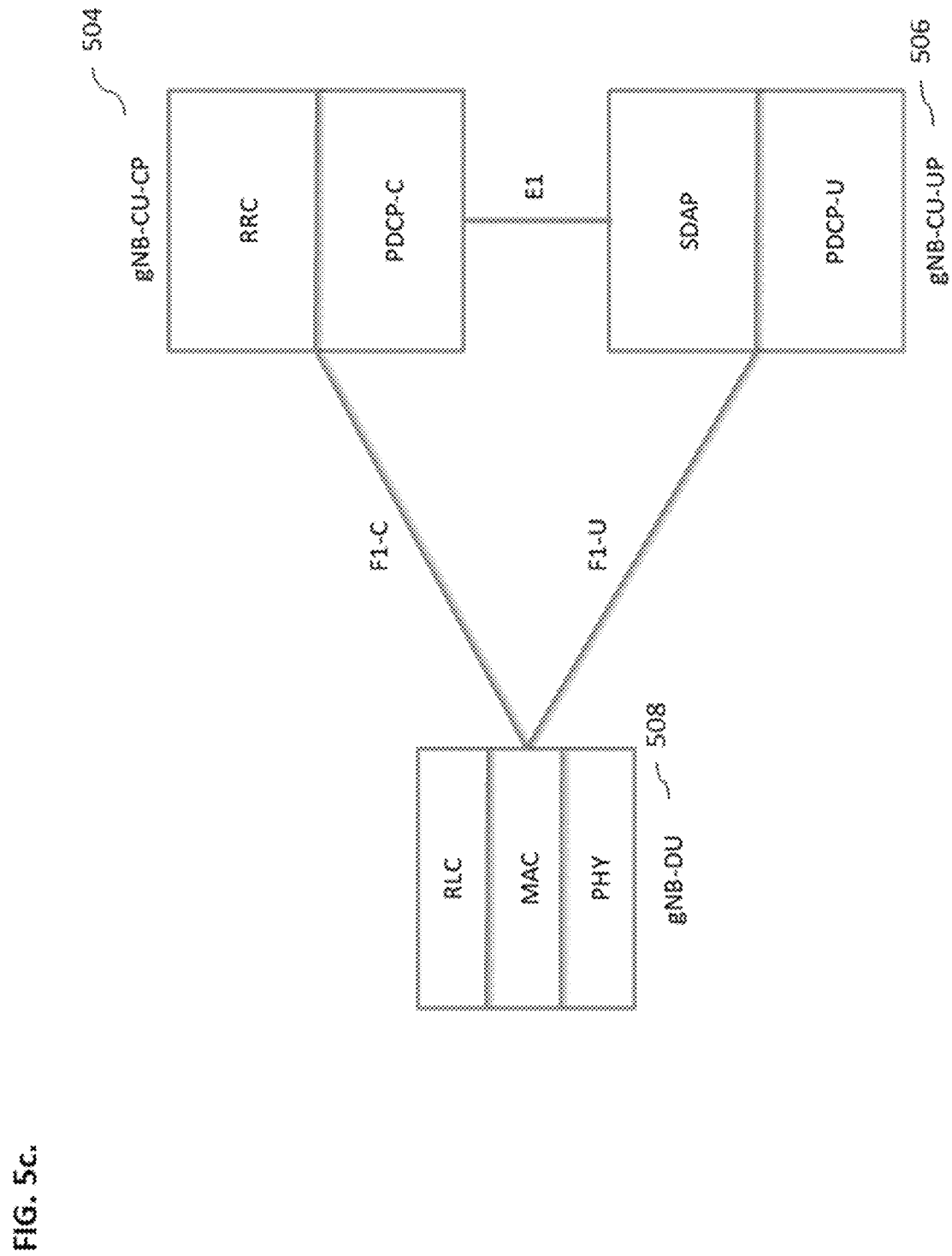
FIG. 5c illustrates an exemplary functional split in the gNB architecture shown in FIGS. 5a-b.

FIG. 5c illustrates an exemplary functional split in the gNB architecture shown in FIGS. 5a-b. As shown in FIG. 5c, the gNB-DU 508 may be communicatively coupled to the gNB-CU-CP 504 and gNB-CU-UP 506 using an F1-C communication interface. The gNB-CU-CP 504 and gNB-CU-UP 506 may be communicatively coupled using an E1 communication interface. The higher part of the PHY layer (or Layer 1) may be executed by the gNB-DU 508, whereas the lower parts of the PHY layer may be executed by the RUs (not shown in FIG. 5c). As shown in FIG. 5c, the RRC and PDCP-C portions may be executed by the control plane portion 504, and the SDAP and PDCP-U portions may be executed by the user plane portion 506.

Some of the functions of the PHY layer in 5G communications network can include error detection on the transport channel and indication to higher layers, FEC encoding/decoding of the transport channel, hybrid ARQ soft-combining, rate matching of the coded transport channel to physical channels, mapping of the coded transport channel onto physical channels, power weighting of physical channels, modulation and demodulation of physical channels, frequency and time synchronization, radio characteristics measurements and indication to higher layers, MIMO antenna processing, digital and analog beamforming, RF processing, as well as other functions.

The MAC sublayer of Layer 2 can perform beam management, random access procedure, mapping between logical channels and transport channels, concatenation of multiple MAC service data units (SDUs) belonging to one logical channel into transport block (TB), multiplexing/demultiplexing of SDUs belonging to logical channels into/from TBs delivered to/from the physical layer on transport channels, scheduling information reporting, error correction through HARQ, priority handling between logical channels of one UE, priority handling between UEs by means of dynamic scheduling, transport format selection, and other functions. The RLC sublayer's functions can include transfer of upper layer packet data units (PDUs), error correction through ARQ, reordering of data PDUs, duplicate and protocol error detection, re-establishment, etc. The PDCP sublayer can be responsible for transfer of user data, various functions during re-establishment procedures, retransmission of SDUs, SDU discard in the uplink, transfer of control plane data, and others.

Layer 3's RRC sublayer can perform broadcasting of system information to NAS and AS, establishment, maintenance and release of RRC connection, security, establishment, configuration, maintenance and release of point-point radio bearers, mobility functions, reporting, and other functions.

III. Configuration Selection Enhancements for LTM

In general, disaggregated architecture is defined in 3GPP decomposing a gNodeB (gNB) into multiple logical entities. Likewise, a single DU can host multiple cells. Currently, in accordance with 3GPP standards, a single DU can host a maximum of 512 LTM target cells. As discussed above, a gNB-CU-CP hosts PDCP and RRC layers, while a gNB-DU hosts RLC, MAC, and PHY layers. Scheduling operations take place at the gNB-DU.

Traditionally, in order to support L1/L2 centric inter-cell change (e.g., change of a serving cell) in the disaggregated gNB architecture, configuration takes place at the gNB-CU-CP but cannot be executed autonomously by the gNB-DU without further interaction with the upper layers. In LTM, and also in multiple transmission and reception point (mTRP), configuration preparation for a handover from a serving cell to a target cell is always performed by the CU-CP and the execution is performed by the DU. This means that the CU-CP needs to be able to decide at a given time instant, what configuration to request from the DU. In the existing methods there is a lack of awareness of configuration details at the CU, which makes it impossible for the CU-CP to select the required configuration from the target cell at the DU. Configuration selection enhancements for LTM as described herein may allow for configuration selection enhancements for LTM at a DU and for the CU-CP to be aware of the DU's situation and of what configuration is likely to succeed at the DU.

Layer 1/layer 2 triggered mobility (LTM) is an updated term for lower layer mobility (LLM). RAN2 has agreed on a definition of LTM. In general, LTM is a mobility procedure that allows a network to switch a UE from a source cell to a target cell without necessarily requiring a reconfiguration with sync. In particular, the network, based on L1 measurements received, can indicate in an L2 signaling (e.g., a message such as a MAC CE) a beam belonging to an LTM candidate cell to which the UE should perform the LTM cell switch procedure. The UE is provided with at least one LTM candidate cell configuration by the network before execution of an LTM cell switch procedure.

In some implementations of the current subject matter, a base station (e.g., the gNodeB of FIG. 5a, a next generation RAN (NG-RAN) node such as an eNodeB or a gNodeB, etc.) of a wireless communication system (e.g., a 5G wireless communication system, a 6G or later generation wireless communication system, etc.) can have a disaggregated architecture in which the base station includes one gNB-CU-CP (e.g., gNB-CU-CP 504 of FIGS. 5a-5c, etc.) and more than one CU-UP (e.g., gNB-CU-UP 506 of FIGS. 5a-5c, etc.) and gNB-DU (e.g., gNB-DUs 508, 510 of FIGS. 5a-5c, etc.). The base station can be configured to provide configuration selection enhancements for LTM.

Figure 6A:
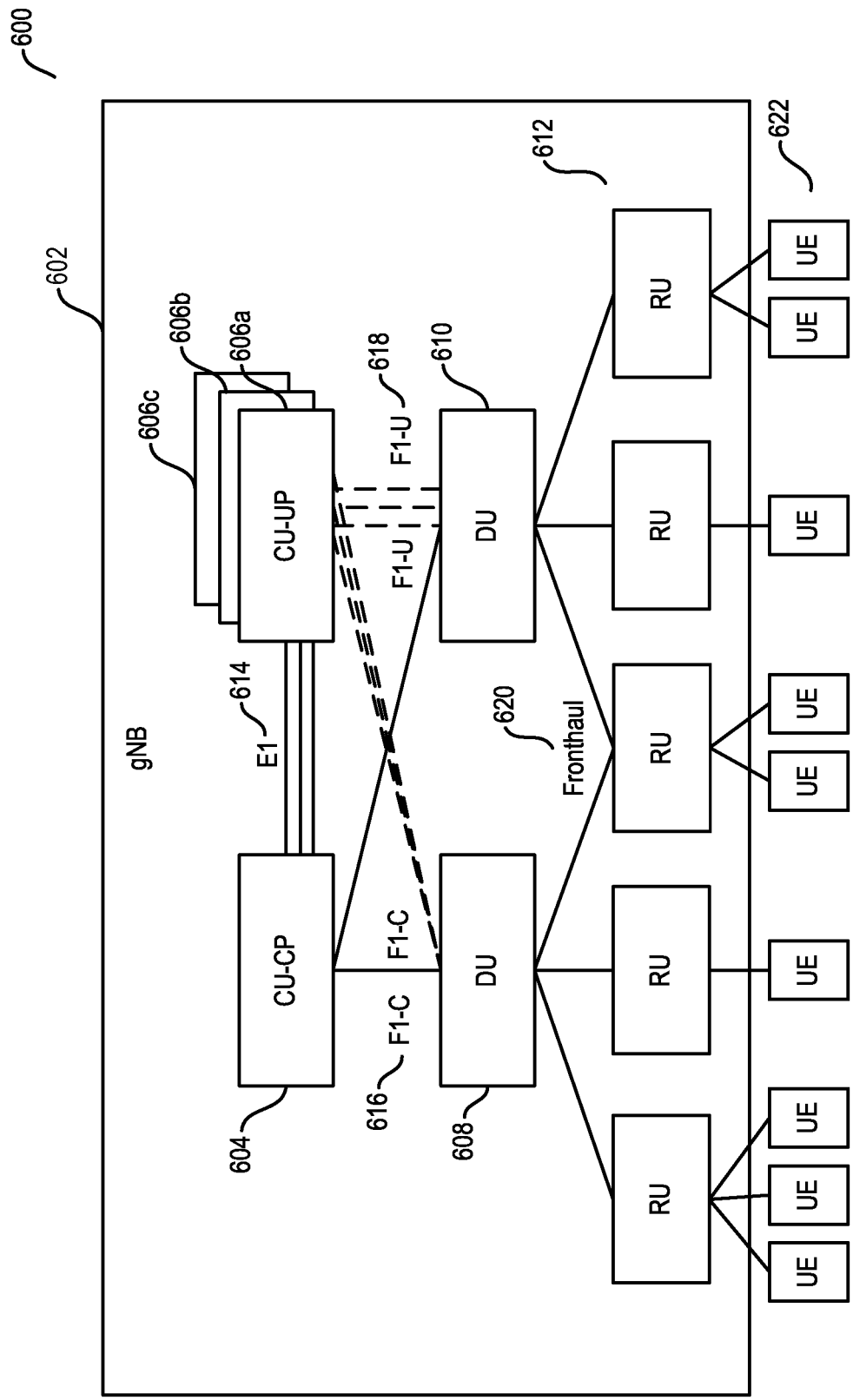
FIG. 6a illustrates an exemplary system, according to some implementations of the current subject matter.

FIG. 6a illustrates an exemplary system 600 configured to allow for configuration selection enhancements for LTM. A base station 602 in this illustrated implementation is a gNB configured to be in a 5G wireless communication system similar to the 5G wireless communication system 500 of FIG. 5a discussed above, but other base stations can be similarly configured and used in providing configuration selection enhancements for LTM. In the illustrated implementation of FIG. 6a, the base station 602 includes a plurality of CU-UPs 606a, 606b, 606c. The base station 602 includes three CU-UPs 606a, 606b, 606c in this illustrated implementation but can include another plural number of CU-UPs. The CU of the base station 602 that includes the plurality of CU-UPs 606a, 606b, 606c is configured to be communicatively coupled with a core network (not shown in FIG. 6a), e.g., the 5GC 502 of FIG. 5a, etc.

The CU of the base station 602 also includes a CU-CP 604 configured to be communicatively coupled to the CU's user plane portion 606a, 606b, 606c using an E1 communication interface 614. The E1 interface 614 includes three communication links in this illustrated implementation to reflect that there are three CU-UPs 606a, 606b, 606c with which the CU-CP 604 can be configured to communicate.

The base station 602 also includes a plurality of DUs 608, 610. The base station 602 includes two DUs 608, 610 in this illustrated implementation but can include another plural number of DUs. The CU-CP 604 is configured to be communicatively coupled to the DUs 608, 610 using F1-C communication interfaces 616. The CU-UPs 606a, 606b, 606c are configured to be communicatively coupled to the DUs 608, 610 using F1-U communication interfaces 618. The F1-U interface 618 associated with each of the DUs 608, 610 includes three communication links in this illustrated implementation to reflect that there are three CU-UPs 606a, 606b, 606c with which each DU 608, 610 can be configured to communicate.

The base station 602 also includes a plurality of RUs 612. The base station 602 includes five RUs 612 in this illustrated implementation but can include another plural number of RUs. The RUs 612 are configured to be communicatively coupled to the DUs 608, 610 via a fronthaul network 620. Additionally, each of the RUs 612 is configured to be communicatively coupled to one or more UEs 622. In this illustrated implementation, two of the RUs 612 are shown communicatively coupled to one UE 622, two of the RUs 612 are shown communicatively coupled to two UEs 622, and one of the RUs 612 is shown communicatively coupled to three UEs 622, but each of the RUs 612 can be coupled to another number of UEs same or different from any of the other RUs 612.

Secure L1/L2 centric inter-cell mobility execution can be configured to occur when one of the UEs communicatively coupled with the base station 602 is handed off from one of the DUs 608, 610 of the base station 602 to the other of the DUs 608, 610 also of the same base station 602. The one of the DUs 608, 610 currently providing service to the UE 622 is referred to as a "serving DU" due to it currently providing service to the UE 622, e.g., currently serving the UE 622. The one of the DUs 608, 610 to which the UE's service is being handed off is referred to as a "target DU" due to it being targeted to provide service to the UE 622.

Figure 6B:
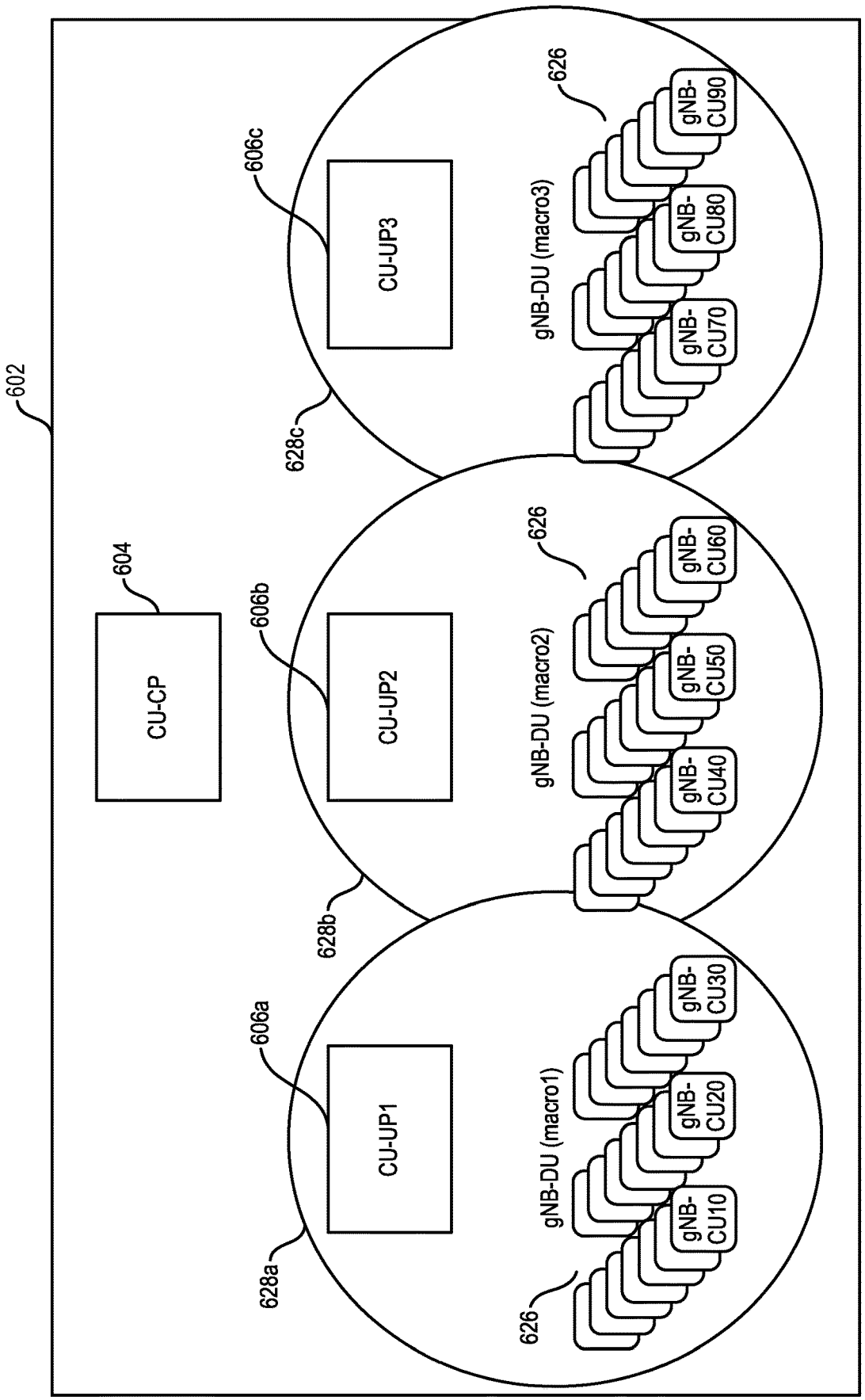
FIG. 6b illustrates an exemplary alternate configuration of the system of FIG. 6a, according to some implementations of the current subject matter.

A system in which executing secure L1/L2 centric inter-cell mobility can be configured to occur is further described with respect to FIG. 6b. FIG. 6b illustrates the CU-CP 604 and the CU-UPs 606a, 606b, 606c of FIG. 6a, but in the illustrated implementation of FIG. 6b, the base station 602 includes more than two DUs. In the illustrated implementation of FIG. 6b, the base station 602 includes sixty-six DUs. Three of the DUs 628a, 628b, 628c are macro cells (labeled macro1, macro2, and macro3 in FIG. 6b), and sixty-three of the DUs 626 small cells (nine of which are labeled in FIG. 6b as gNB-DU10, gNB-DU20, gNB-DU30, gNB-DU40, gNB-DU50, gNB-DU60, gNB-DU70, gNB-DU80, and gNB-DU90). The base station 602 can include another number of macro cells and/or another number of small cells. The macro1 DU 628a, the macro2 DU 628b, and twenty-one of the small cell DUs 626 including gNB-DU10, gNB-DU20, and gNB-DU30 are configured to be served by the first CU-UP 606a (labeled CU-UP1 in FIG. 6b). The macro1 DU 628a, macro2 DU 628b, macro3 DU 628c, and twenty-one of the small cell DUs 626 including gNB-DU40, gNB-DU50, and gNB-DU60 are configured to be served by the second CU-UP 606b (labeled CU-UP2 in FIG. 6b). The macro2 DU 628b, macro3 DU 628c, and twenty-one of the small cell DUs 626 including gNB-DU70, gNB-DU80, and gNB-DU90 are configured to be served by the third CU-UP 606c (labeled CU-UP3 in FIG. 6b).

In the implementation shown in FIG. 6b, each CU-UP 606a, 606b, 606c is serving a subset of DUs 626, 628a, 628b, 628c for all the services. However, a CU-UP can serve all the DUs of the base station for one service (e.g., enhanced mobile broadband (eMBB)), while serving a subset of the DUs for another service (e.g., vehicle-to-everything (V2X) or ultra-reliable low latency communication (URLLC)).

Figure 7A:
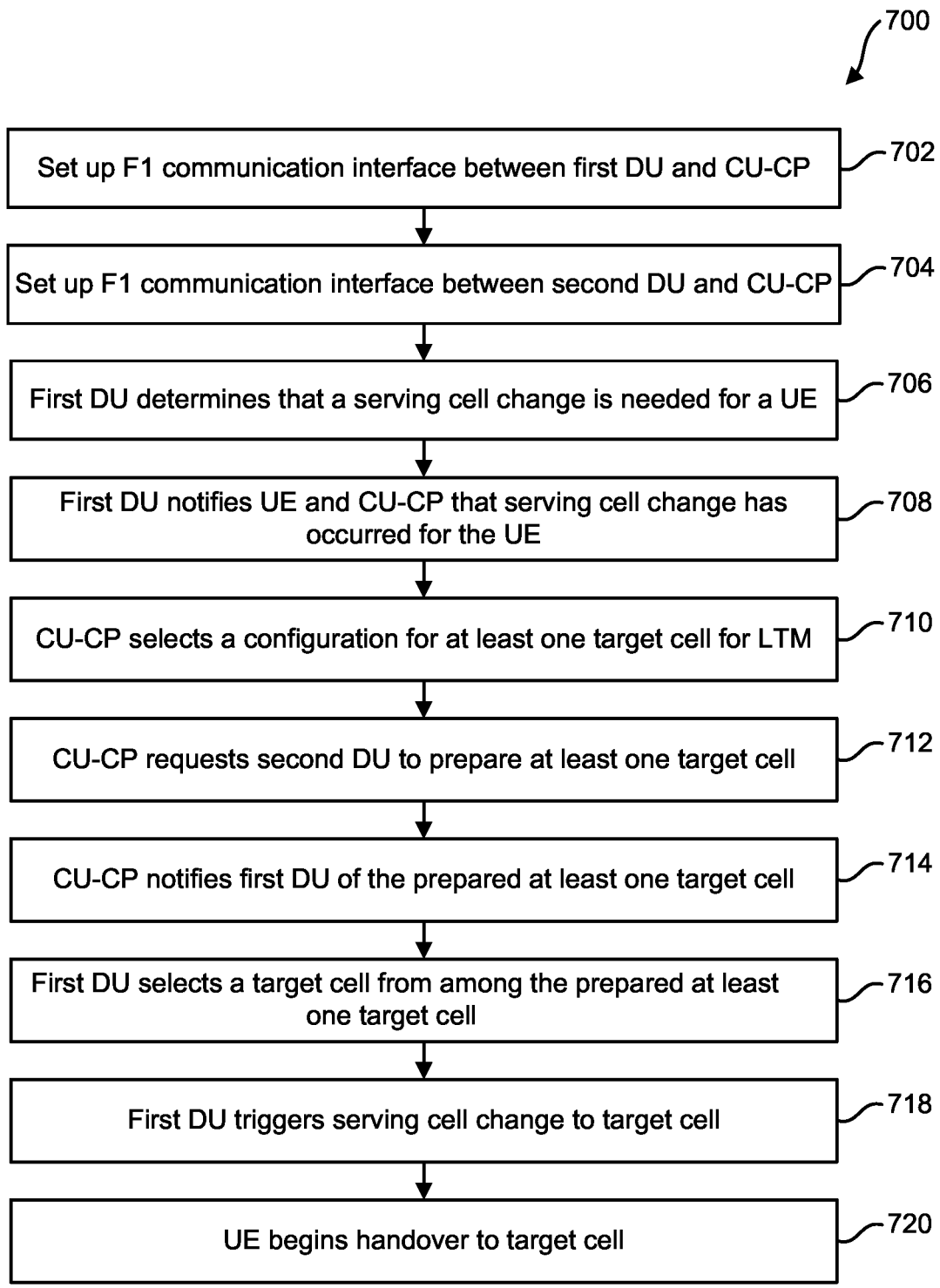
FIG. 7a illustrates an exemplary method, according to some implementations of the current subject matter.

FIG. 7a illustrates an exemplary method 700, according to some implementations of the current subject matter. The method 700 of FIG. 7a is described with respect to an exemplary system 800 illustrated in FIGS. 8a-8d but can be implemented similarly with other systems, e.g., the system 100 of FIGS. 1a-1c and 2, the system 400 of FIG. 4, the system 500 of FIG. 5a, the systems of FIGS. 6a and 6b, etc. The system 800 of FIGS. 8a-8d is a 5G system, but as mentioned above, configuration selection enhancements for LTM as described herein can be performed with other types of wireless communications systems, such as LTE wireless communications systems or 6G or later generation wireless communications systems. Various elements in FIGS. 8a-8d are numbered as sequential steps, but such numbering is not intended to indicate that only these numbered steps in this sequential order may be performed in the system 800. One or more additional steps may be present before and/or after any one or more of the sequentially numbered steps shown in FIGS. 8a-8d.

In the system 800, a UE (e.g., UE 104 of FIGS. 1a-1c, UE 622 of FIG. 6a, etc.) (not shown in FIGS. 8a-8d) is configured with LTM with one or more target cells in one or more DUs 802, 804 (e.g., DU 508 of FIGS. 5a-5c, DU 510 of FIG. 5a, DU 608 of FIG. 6a, DU 610 of FIG. 6a, DUs 626 of FIG. 6b, DUs 628a, 628b, 628c of FIG. 6b, etc.) of a base station, e.g., a gNB (e.g., gNodeB of FIG. 5a, gNodeB 624 of FIGS. 6a and 6b, etc.). More than one UE can be communicatively coupled to the base station, and/or the base station can include more than two DUs. The base station of the system 800 also includes a CU including a CU-CP 806 (e.g., gNB-CU-CP 504 of FIGS. 5a-5c, CU-CP 604 of FIGS. 6a and 6b, etc.) and one or more CU-UPs (e.g., gNB-CU-UP 506 of FIGS. 5a-5c, CU-UPs 606a, 606b, 606c of FIGS. 6a and 6b, etc.) (not shown in FIGS. 8a-8d), and a plurality of RUs (e.g., RUs 512 of FIG. 5a, RUs 612 of FIG. 6a, etc.) (not shown in FIGS. 8a-8d). The UE is currently being served by a first DU 802 of the base station. Additionally, the base station of FIGS. 8a-8d is communicatively coupled with a core network (e.g., EPC 108 of FIGS. 1a-1c and 2, 5GC 502 of FIG. 5a, etc.) (not shown in FIGS. 8a-8d).

As shown in FIG. 7a, an F1 communication interface is set up 702 between the first DU (labeled "gNB-DU1" in FIGS. 8a-8d) 802 and the CU-CP 806, and an F1 communication interface is set up 704 between the second DU (labeled "gNB-DU2" in FIGS. 8a-8d) 804 and the CU-CP 806. The F1 communications interfaces can be set up 702, 704 in accordance with 3GPP standards. FIG. 7a shows the F1 communications interface being set up 702 between the first DU 802 and the CU-CP 806 before the F1 communications interface is set up between the second DU 804 and the CU-CP 806, but the F1 communications interface can be set up 704 between the second DU 804 and the CU-CP 806 before the F1 communications interface is set up 702 between the first DU 802 and the CU-CP 806.

During use of the first DU 802, the first DU 802 can provide at least one service to the UE. The method 700 shows an implementation of an inter-DU LTM serving cell change scenario which includes the first DU (also referred to herein as a "serving DU") 802 determining 706 that a serving cell change is needed for the UE. The serving DU's determination 706 can include the serving DU 802 analyzing an intra-frequency L1 measurement report transmitted by the UE, in accordance with 3GPP standards, to the serving DU 802. In accordance with 3GPP standards, the intra-frequency L1 measurement report can include layer 1 (L1) measurements that can be analyzed by the first DU 802 in making resource control decisions, which can include a serving cell change in which the UE is to be served by a DU, e.g., the second DU 804, other than the first DU 802 for at least one service.

In response to determining 706 that a serving cell change should occur, the serving DU 802 notifies 708 the UE of a serving cell change. The notification to the UE can include the serving DU 802 transmitting a serving cell change command, e.g., a MAC CE, to the UE.

Also in response to determining that a cell service change should occur, the serving DU 804 notifies 708 the CU-CP 806 that a serving cell change for the UE has occurred. The notification 708 can thus identify the UE to the CU-CP 806, such as with an identifier, in accordance with 3GPP standards, known to the serving DU 802 that uniquely identifies the UE to the CU-CP 806. The notification 708 to the CU-CP 806 can include the serving DU 802 transmitting a Serving Cell Change Notification message to the CU-CP 806 using the previously set up 702 F1 communication interface. The Serving Cell Change Notification message can include a cell identification (ID) that uniquely identifies the UE that underwent the serving cell change.

In response to receiving the serving cell change command from the serving DU 802, the UE can transmit a Radio Resource Control (RRC) Reconfigure Acknowledgement message to the CU-CP 806. The CU-CP 806 becomes aware from RRC Reconfigure Acknowledgement message that the UE, uniquely identified to the CU-CP 806 by the serving DU 802, acknowledges completion of a successful serving cell change.

Also in response to receiving a layer 3 RRC measurement configuration, the UE can transmit an RRC measurement report to the CU-CP 806, in accordance with 3GPP standards. In accordance with 3GPP standards, the RRC measurement report can include layer 3 (L3) measurements that can be analyzed by the CU-CP 806 in making resource control decisions, which can include deciding to prepare at least one target cell for LTM so the at least one target cell from the target DU 804 is ready to serve the UE instead of the serving DU 804 for at least one service.

In response to deciding to prepare at least one target cell for LTM, the CU-CP 806 selects 710 a configuration for at least one target cell for LTM. The configuration can be selected 710 using data previously received by the CU-CP 806, as discussed further below.

As shown in FIGS. 8a-8d, in these illustrated implementations, each of the at least one target cells is an inter-DU target cell, e.g., is part of a different DU than the serving DU 802 where the same CU (e.g., the CU that includes the CU-CP 806) serves each DU 802, 804. Also in these illustrated implementations, the at least one target cell includes only the target DU 804 since there are only two gNB-DUs, but as mentioned above, the base station can include more than two target cells. Currently, in accordance with 3GPP standards, a maximum of eight LTM target cells can be prepared for a given UE.

Preparing the at least one target cell for LTM can include the CU-CP 806 notifying the at least one target DU 804 that the at least one target DU 804 may be later notified to begin providing service to the UE for at least one service. The target DU 804 can thus reserve necessary resources for the UE. As shown in FIG. 7a, notifying the at least one target cell, which in this illustrated implementation is only the target DU 804, can include the CU-CP 806 requesting the target DU 804 to prepare at least one target cell in accordance with the prepared configuration. The request can include the CU-CP 806 transmitting a UE Context Setup Request message to the target DU 804, in accordance with 3GPP standards, using the previously set up 704 F1 communication interface.

In some implementations, the CU-CP 806 can select a configuration for at least one target cell for LTM using data received from at least one DU 802, 804 during an F1 set up procedure in which an F1 communication interface is set up between the DU and the CU-CP 806. Handover (HO) from one cell of a DU of a base station to another cell of another DU of the base station only occurs after F1 communications interfaces have been set up with each of the DUs. The CU-CP 806 receiving data relevant for HO during an F1 setup procedure may thus ensure that the CU-CP 806 has data relevant for HO on hand before the need for HO arises.

Figure 7B:
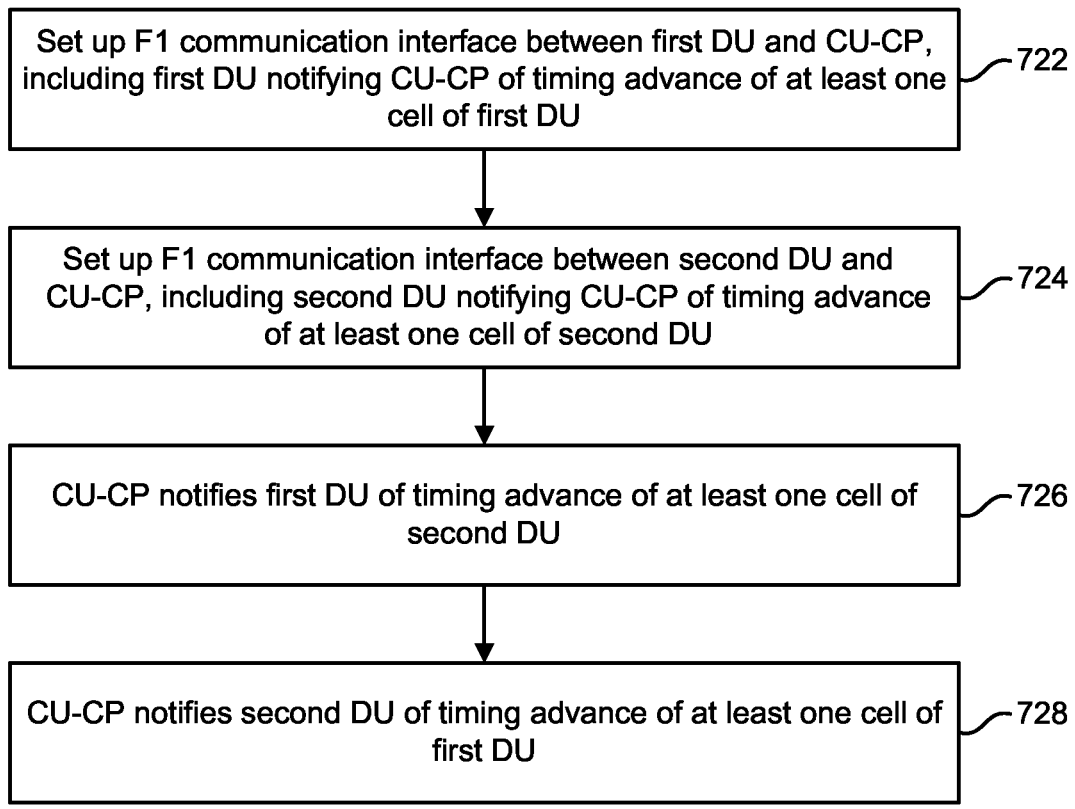
FIG. 7b illustrates another exemplary method, according to some implementations of the current subject matter.
Figure 8A:
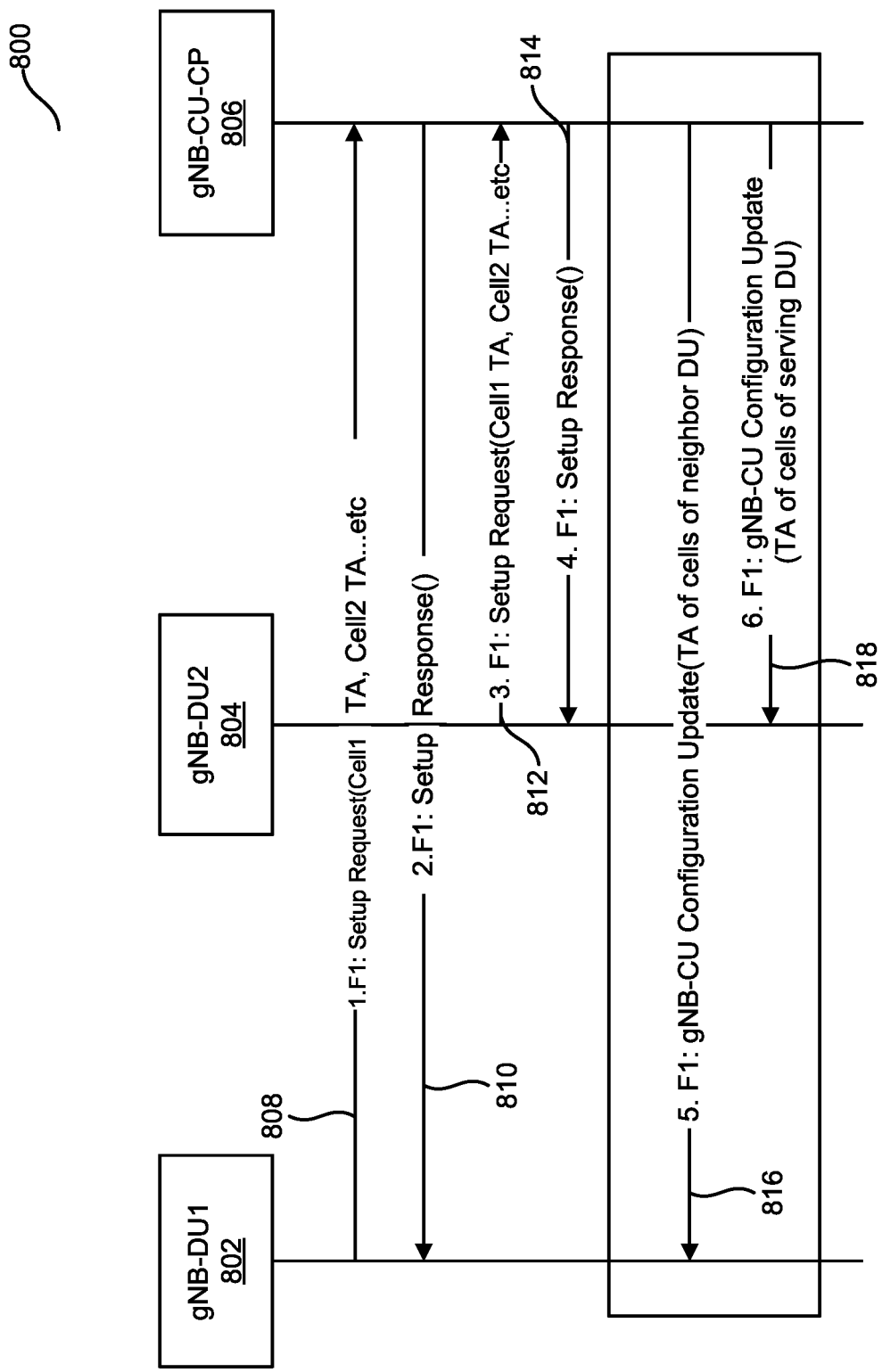
FIG. 8a illustrates an exemplary signalling diagram, according to some implementations of the current subject matter.

In some implementations, such as that illustrated in FIGS. 7b and 8a, the data relevant to HO received by the CU-CP 806 during F1 setup includes timing advance information for a DU's one or more cells. Timing advance (TA) refers to a time offset at a UE between a start of a received downlink subframe and a transmitted uplink subframe. This offset at the UE is necessary to ensure that the downlink and uplink subframes are synchronized at the base station serving the US. This is a MAC layer (layer 2) control element (CE) from a base station to a UE used in controlling uplink, e.g., UE to base station, signal transmission timing.

The CU-CP 806 knowing TA information for the first DU's one or more cells and for the second DU's one or more cells allows the CU-CP 806 to determine whether or not each of the at least one target cells, e.g., the one or more cells of the second DU 804, is a candidate for random access channel layer-less (RACH-less) HO from the serving DU 802 based on whether the target cell's TA is zero or the serving cell's TA is the same as the target cell's TA. If the target cell's TA is zero or the serving cell's TA is the same as the target cell's TA, the target cell is a candidate for RACH-less HO. The CU-CP 806 can thus request 712 the at least one target cell of the second DU 804 to prepare itself for RACH-less HO when possible and to otherwise prepare itself for RACH-based HO. The HO from one cell of the serving DU 802 to another cell of the target DU 804 may therefore take less time since HO from the serving cell to one of the at least one target cells has been already been prepared at each of the one or more target cells to include either a contention-free RACH procedure (for RACH-less HO) or a contention-based RACH procedure (for RACH-based HO). Handover latency may thus be reduced and thereby reduce user plane interruption time.

As discussed above, an F1 communication interface is set up 702, 704 between the CU-CP 806 and each of the first and second DUs 802, 804. As shown in FIGS. 7b and 8a, setting up 702, 722 the F1 communication interface between the first DU 802 and the CU-CP 806 includes the serving DU 802 transmitting 808 an F1: Setup Request to the CU-CP 806 including TA information of all the beams/beam-groups for each cell of the serving DU 802. The serving DU 802 is shown in FIG. 8a as having a plurality of cells including Cell1, Cell2, etc., but the serving DU 802 can include a single cell or can include two or more cells. In response to receipt of the F1: setup request from the serving DU 802, the CU-CP 806 transmits 810 an F1: Setup Response to the serving DU 802.

As also shown in FIGS. 7b and 8a, in an F1 setup procedure in which an F1 communications interface is being set up 704, 724 between the CU-CP 806 and the target DU 804, the target DU 804 transmits 812 an F1: Setup Request to the CU-CP 806 including TA information for all the beams/beam-groups of each cell of the target DU 804. The target DU 804 is shown in FIG. 8a as having a plurality of cells including Cell1, Cell2, etc., but the target DU 804 can include a single cell or can include two or more cells. In response to receipt of the F1: Setup Request from the target DU 804, the CU-CP 806 transmits 814 an F1: Setup Response to the target DU 804.

FIGS. 7a, 7b, and 8a show the F1 communications interface being set up 702, 722 between the serving DU 802 and the CU-CP 806 before the F1 communications interface is set up 704, 724 between the target DU 804 and the CU-CP 806, but the F1 communications interface can be set up 704, 724 between the target DU 804 and the CU-CP 806 before the F1 communications interface is set up 702, 722 between the serving DU 802 and the CU-CP 806.

In some implementations, as shown in FIG. 8a, the CU-CP 806 can provide the TA information received from one DU to each of the base station's other DUs. Each DU can thus be aware of the TA of cells of other DUs and therefore be aware whether RACH-less HO is possible to cells of other DUs. As shown in FIG. 8a, the CU-CP 806 can transmit 816 TA information for the one or more cells of the second DU (also referred to herein as a "neighbour DU") 804 to the first DU 802, e.g., in a gNB-CU Configuration Update message, and can transmit 818 TA information for the one or more cells of the first DU 802 to the second DU 804, e.g., in a gNB-CU Configuration Update message. FIG. 8a shows the CU-CP transmitting 816 TA information to the first DU 802 before transmitting 818 TA information to the second DU 804, but TA information can be transmitted 818 to the second DU 804 before TA information is transmitted 816 to the first DU 802.

In some implementations, the CU-CP 806 can select a configuration for at least one target cell for LTM using data received from at least one DU 802, 804 after the F1 communication interfaces have been set up 702, 704 between the CU-CP 806 and each of the first and second DUs 802, 804. The data can also be received prior to the CU-CP 806 receiving the notification 708 from serving DU 802 that a service change is needed for the UE. Handover (HO) from one cell of a DU of a base station to another cell of another DU of the base station only occurs in a case in which the CU-CP 806 receives notice that such a change is needed. The CU-CP 806 receiving data relevant for HO prior to receiving the notification 708 from the serving DU 802 may thus ensure that the CU-CP 806 has data relevant for HO on hand before the need for HO arises.

Figure 7C:
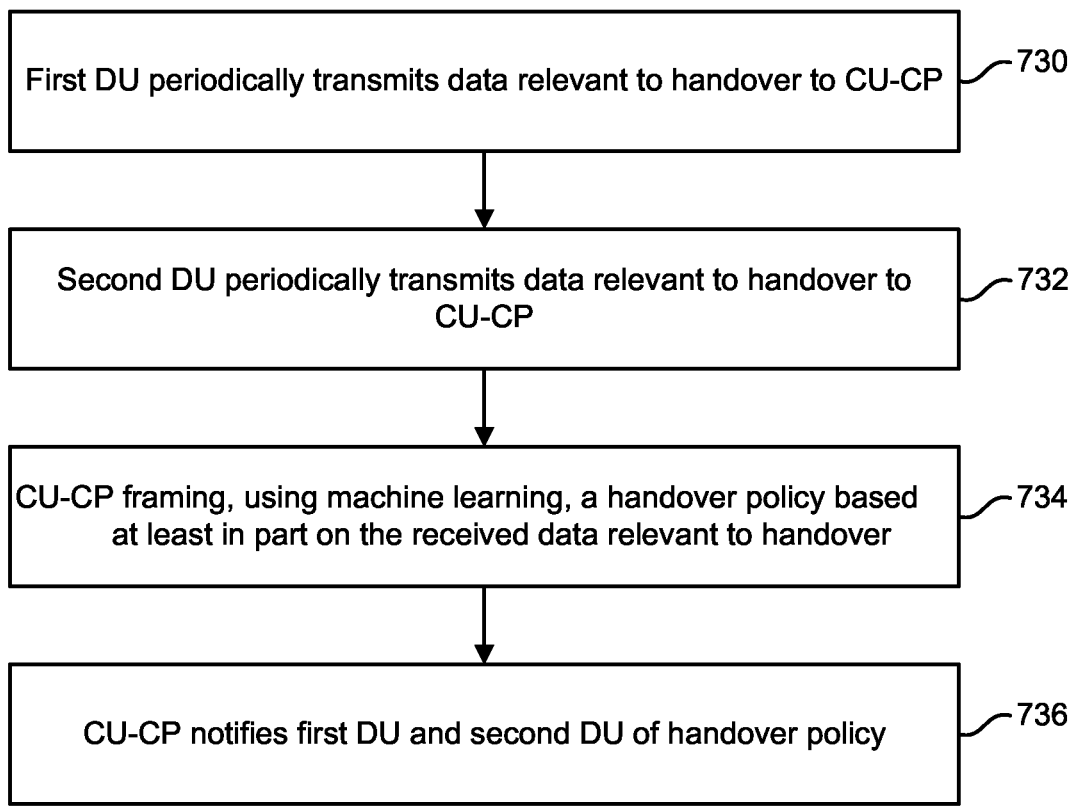
FIG. 7c illustrates yet another exemplary method, according to some implementations of the current subject matter.
Figure 8B:
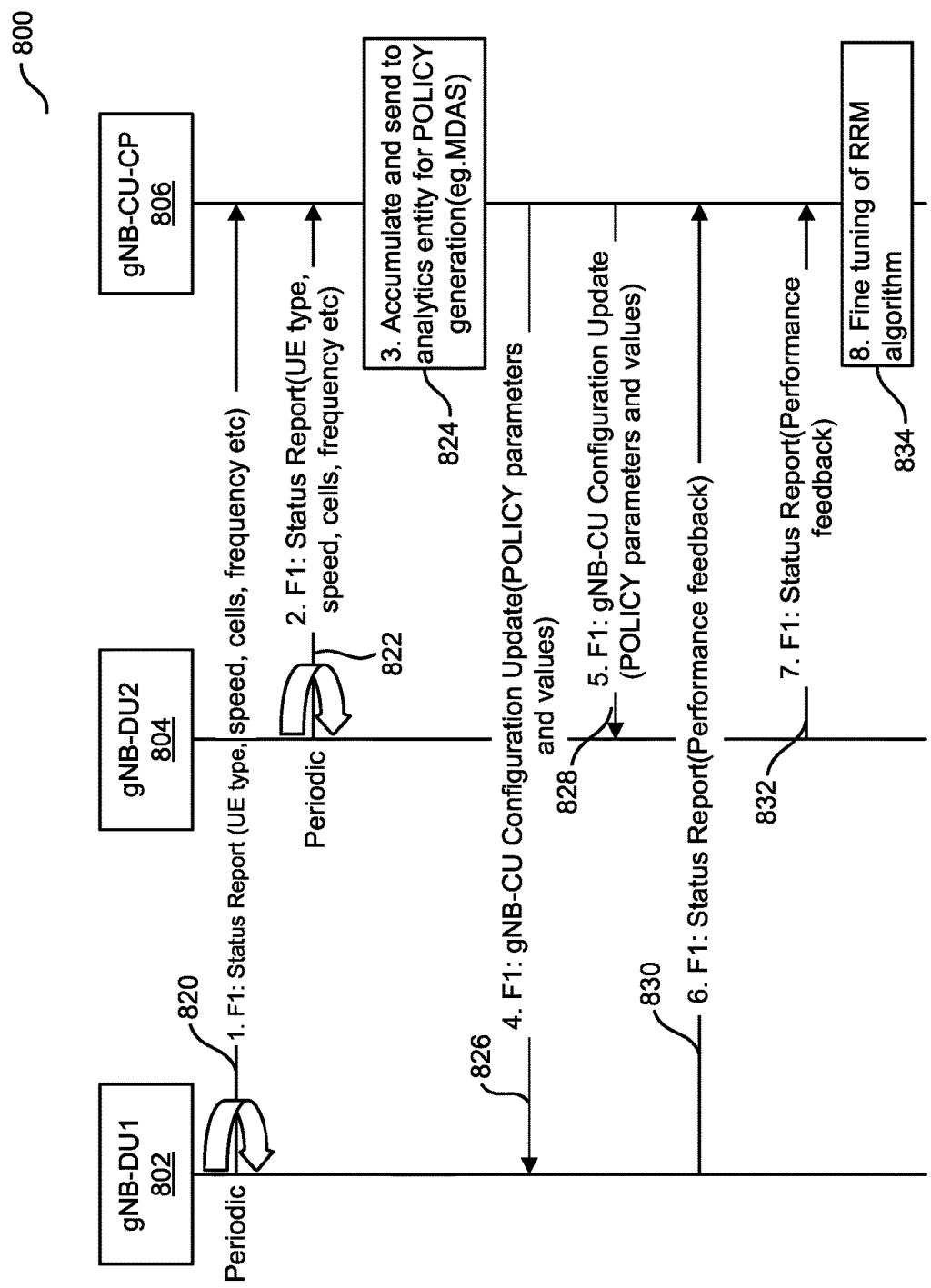
FIG. 8b illustrates another exemplary signalling diagram, according to some implementations of the current subject matter.

In some implementations, such as that illustrated in FIGS. 7c and 8b, in which the CU-CP 806 receives data relevant to HO after F1 setup and prior to the CU-CP 806 receiving notification 708 that a serving cell change is needed for the UE, the CU-CP 806 can determine dynamic switching possibility using a machine learning (ML) based data collection and training algorithm. The machine learning can involve artificial intelligence (AI), as will be appreciated by a person skilled in the art. The CU-CP 806 can periodically receive data relevant to HO prior to the CU-CP 806 receiving notification 708 that a serving cell change is needed for the UE, and the CU-CP can frame, using machine learning, a HO policy based at least in part on the received data. The CU-CP 806 can also provide the policy to the DUs 802, 804 of the base station so that the DUs 802, 804 are aware, prior to needing to prepare at least one target cell for LTM, of a policy indicating how the at least one target cell should be prepared for LTM.

The data that the CU-CP 806 can collect from the DUs 802, 804 and use in the framing can include data regarding of at least one of a type of the UE, a speed of the UE, at least one service accessed at the serving DU 802 by the UE, and dynamic switching between a first cell of the serving DU 802 and a second cell of the serving DU 802.

The UE type (and/or capability), speed, and accessed services may enable the machine learning at the CU-CP 806 to identify the kind of UEs undergoing dynamic switching and generate different policies for different kinds of UEs. Having different policies for different kinds of UEs recognizes that different UEs can have different types of mobility. For example, a cellular phone (a first type of UE) typically has more mobility than a laptop (a second type of UE), which typically has more mobility than a parking meter (a third type of UE). For another example, a smart watch (a fourth type of UE) typically has more mobility than a game console (a fifth type of UE), which typically has more mobility than a server (a sixth type of UE). Examples of UEs include a cellular phone, a smart phone, a session initiation protocol (SIP) phone, a laptop, a personal digital assistant (PDA), a satellite radio, a global positioning system (GPS), a multimedia device, a video device, a digital audio player (e.g., MP3 player, etc.), a camera, a game console, a tablet, a smart device, a wearable device (e.g., a smart watch or other device), a vehicle, an electric meter, a gas pump, a large or small kitchen appliance, a healthcare device, an implant, a sensor/actuator, a display, or any other similarly functioning device. A UE can be an Internet-of-Things (IoT) device (e.g., parking meter, gas pump, toaster, vehicles, heart monitor, etc.).

Dynamic switching is a phenomenon where a network expects a ping pong between the serving and target cells and prepares the serving and target cells to be equipped for this back-and-forth switching. Associating dynamic switching with the type of UE can be used to optimize network planning in the loaded cells. Data regarding dynamic switching between a first cell of the serving DU 802 and a second cell of the serving DU 802 can include an identity of the first and second cells, frequency of switching occurrence including source and target beam information, time of day dynamic switching occurs, and/or critical resources at the serving DU 802 that become overloaded because of dynamic switching. Associating source and target beam information with the type of UE can be used to optimize network planning in the loaded cells. Knowing time of day may enable optimized resource planning in the cells undergoing dynamic switching. Knowing overload of critical resource may assist optimized resource management from the CU-CP 806.

As shown in FIGS. 7c and 8b, the first DU 802 can periodically transmit 730, 820 to the CU-CP 806 data relevant to HO that includes at least one of a type of the UE, a speed of the UE, at least one service accessed at the serving DU 802 by the UE, and dynamic switching between a first cell of the serving DU 802 and a second cell of the serving DU 802. The second DU 804 can also periodically transmit 732, 822 to the CU-CP 806 data relevant to HO that includes at least one of a type of the UE, a speed of the UE, at least one service accessed at the second DU 804 by the UE, and dynamic switching between a first cell of the second DU 804 and a second cell of the second DU 804. As also shown in FIGS. 7c and 8b, the data can be transmitted 730, 820 from the serving DU 802 in a status report message via the previously set up 702 F1 interface and can be transmitted 732, 822 from the target DU 804 in a status report message via the previously set up 704 F1 interface. FIG. 8b shows the first DU 802 transmitting 730, 820 the data to the CU-CP 806 before the second DU 804 transmits 732, 832 the data to the CU-CP 806, but the second DU 804 can transmit 732, 832 the data to the CU-CP 806 before the first DU 802 transmits 730, 830 the data to the CU-CP 806.

The timing of the periodic reporting from the DUs 802, 804 can be pre-programmed and be based on one or more factors. For example of a factor, the periodic reports can be sent according to a predetermined time schedule such that reports are regularly received by the CU-CP 806. For another example of a factor, a periodic report can be sent after a predetermined number of serving cell changes has occurred within the DU (e.g., a predetermined number of dynamic switches has occurred). For yet another example of a factor, a periodic report can be sent based on a size of the report. A report may be large since a DU typically serves multiple UEs and data would be sent to the CU-CP 806 regarding each UE.

The CU-CP 806 generates and frames 824, using the ML based data collection and training algorithm, a handover policy based at least in part on the data received from the DUs 802, 804 in the status reports. The CU-CP 806 can be configured to repeatedly generate and frame 824 policies as new data is received. The ML based data collection and training algorithm is RRM specific and is thus vendor specific. In other words, a vendor of the CU-CP 806, e.g., a vendor of the gNB that includes the CU-CP 806, can build its own algorithm to manage resources and to configure UEs as desired for that particular vendor.

The CU-CP 806 notifies 736 the first and second DUs 802, 804 of the handover policy including its parameters and values. As shown in FIG. 8b, the notification 736 can include the CU-CP 806 transmitting 826 a gNB-CU Configuration Policy message to the first DU 802 via the previously set up 702 F1 communication interface and transmitting 828 a gNB-CU Configuration Policy message to the second DU 804 via the previously set up 704 F1 communication interface. FIG. 8b shows the CU-CP 806 transmitting 826 the handover policy to the first DU 802 before transmitting 828 the handover policy to the second DU 804, but the CU-CP 806 can transmit 826 the handover policy to the first DU 802 after transmitting 828 the handover policy to the second DU 804.

As shown in FIG. 8b, after notifying 736 the first and second DUs 802, 804 of the handover policy, the CU-CP 806 can fine tune 834 the ML based data collection and training algorithm using performance feedback transmitted 830 to the CU-CP 806 from the first DU 802 and performance feedback transmitted 832 to the CU-CP 806 from the second DU 804. The algorithm may thus become more effective over time. The performance feedback can be transmitted 830, 832 any number of times, and thus the fine tuning 834 can be repeated any number of times.

Figure 7D:
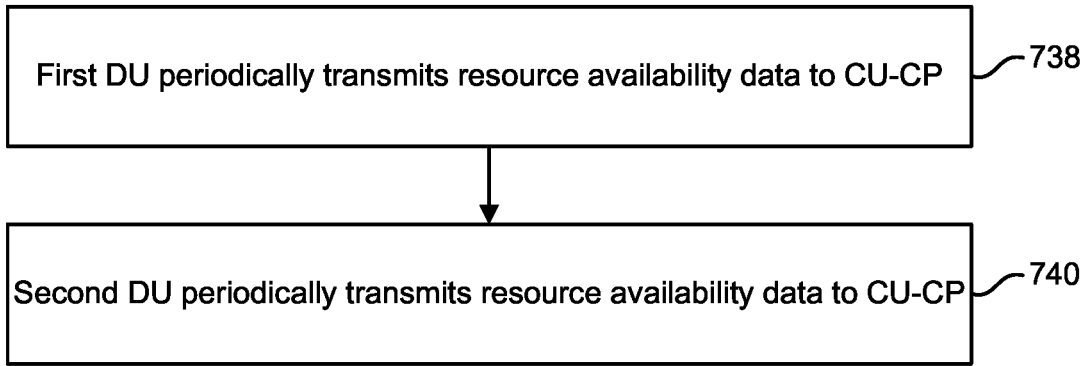
FIG. 7d illustrates still another exemplary method, according to some implementations of the current subject matter.
Figure 8C:
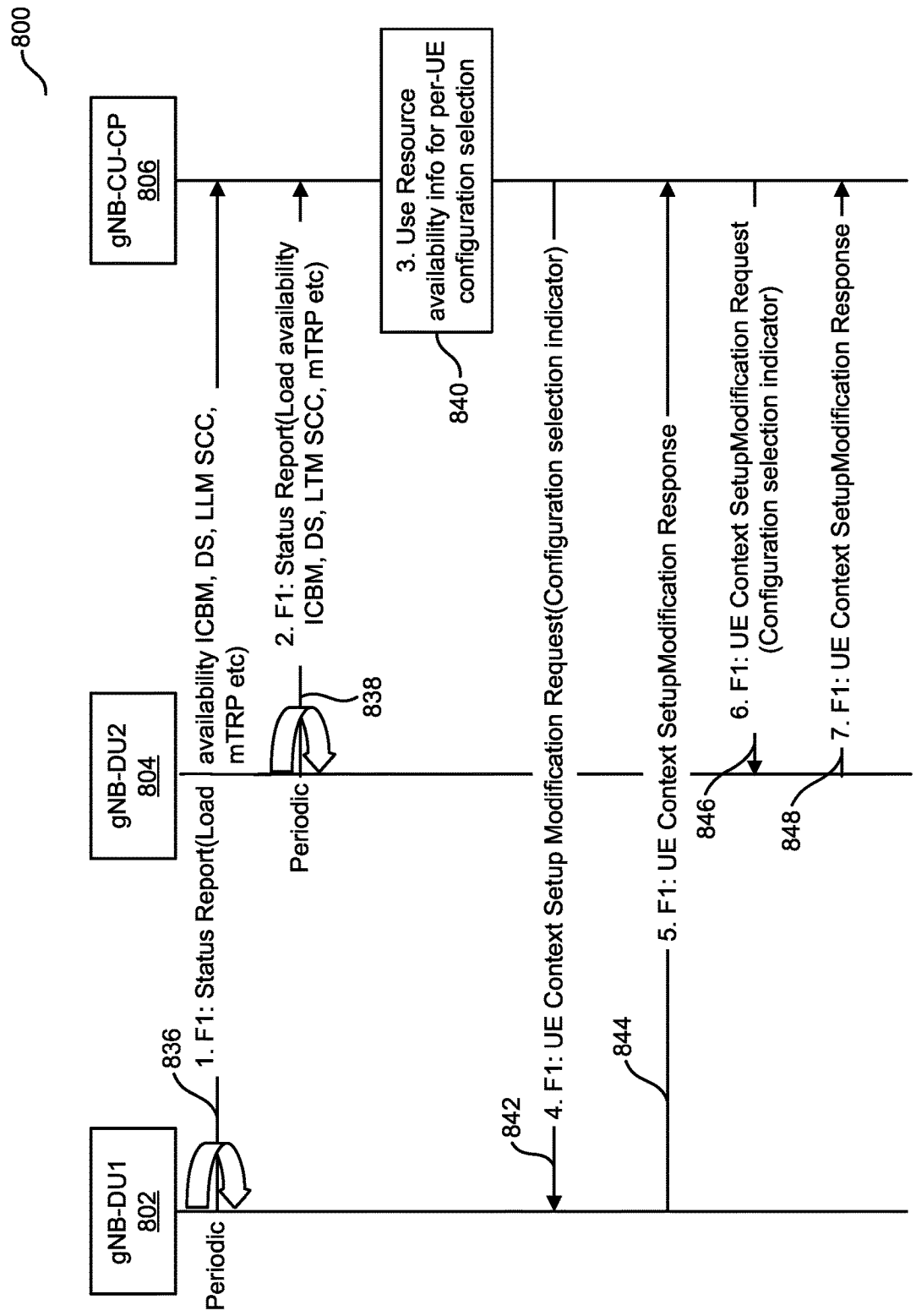
FIG. 8c illustrates yet another exemplary signalling diagram, according to some implementations of the current subject matter.

In some implementations, such as that illustrated in FIGS. 7d and 8c, in which the CU-CP 806 receives data relevant to HO after F1 setup and prior to the CU-CP 806 receiving notification 708 that a serving cell change is needed for the UE, the data relevant to HO received by the CU-CP 806 includes resource availability of a DU's one or more cells. The resource availability includes availability at each of the one or more cells for one or more of ICBM, dynamic switching, mTRP, and LTM SCC. In some implementations, availability for each of ICBM, dynamic switching, mTRP, and LTM SCC is provided to the CU-CP 806, which may allow the CU-CP 806 to have as much information as possible about available resources at cells/beam groups and make informed configuration decisions for target cells.

As shown in FIGS. 7d and 8c, the first DU 802 can periodically transmit 738, 836 data relevant to HO that includes resource availability of the first DU's one or more cells. The second DU 804 can also periodically transmit 740, 838 to the CU-CP 806 data relevant to HO that includes resource availability of the second DU's one or more cells. FIG. 8c shows the first DU 802 transmitting 738, 836 the data to the CU-CP 806 before the second DU 804 transmits 740, 838 the data to the CU-CP 806, but the second DU 804 can transmit 740, 838 the data to the CU-CP 806 before the first DU 802 transmits 738, 836 the data to the CU-CP 806. Periodic reporting of resource availability reflects that resources can become available or unavailable based on one or more new UEs being served by a particular DU, a particular DU stopping service to one or more UEs, and/or changing needs of one or more UEs being served by a particular DU.

The timing of the periodic reporting from the DUs 802, 804 can be pre-programmed and be based on one or more factors. For example of a factor, the periodic reports can be sent according to a predetermined time schedule such that reports are regularly received by the CU-CP 806. For another example of a factor, a periodic report can be sent after a predetermined number of serving cell changes has occurred within the DU (e.g., a predetermined number of dynamic switches has occurred). For yet another example of a factor, a periodic report can be sent based on a size of the report. A report may be large since a DU typically serves multiple UEs and data would be sent to the CU-CP 806 regarding each UE.

Figure 7E:
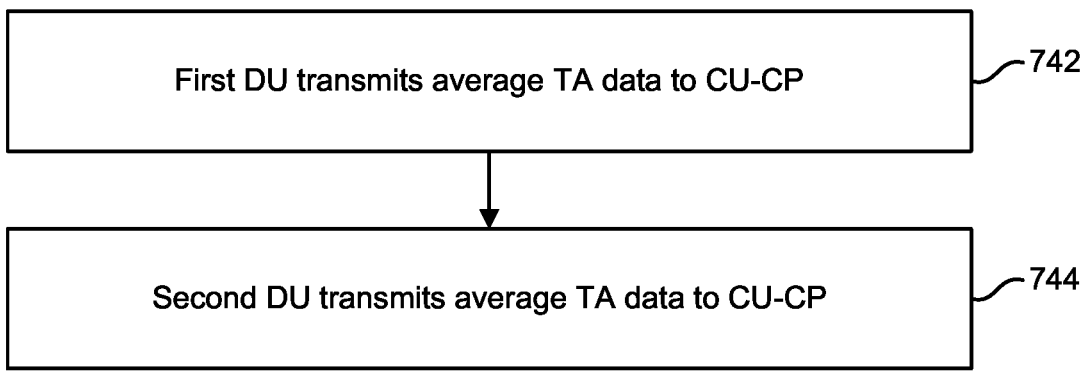
FIG. 7e illustrates still another exemplary method, according to some implementations of the current subject matter.
Figure 8D:
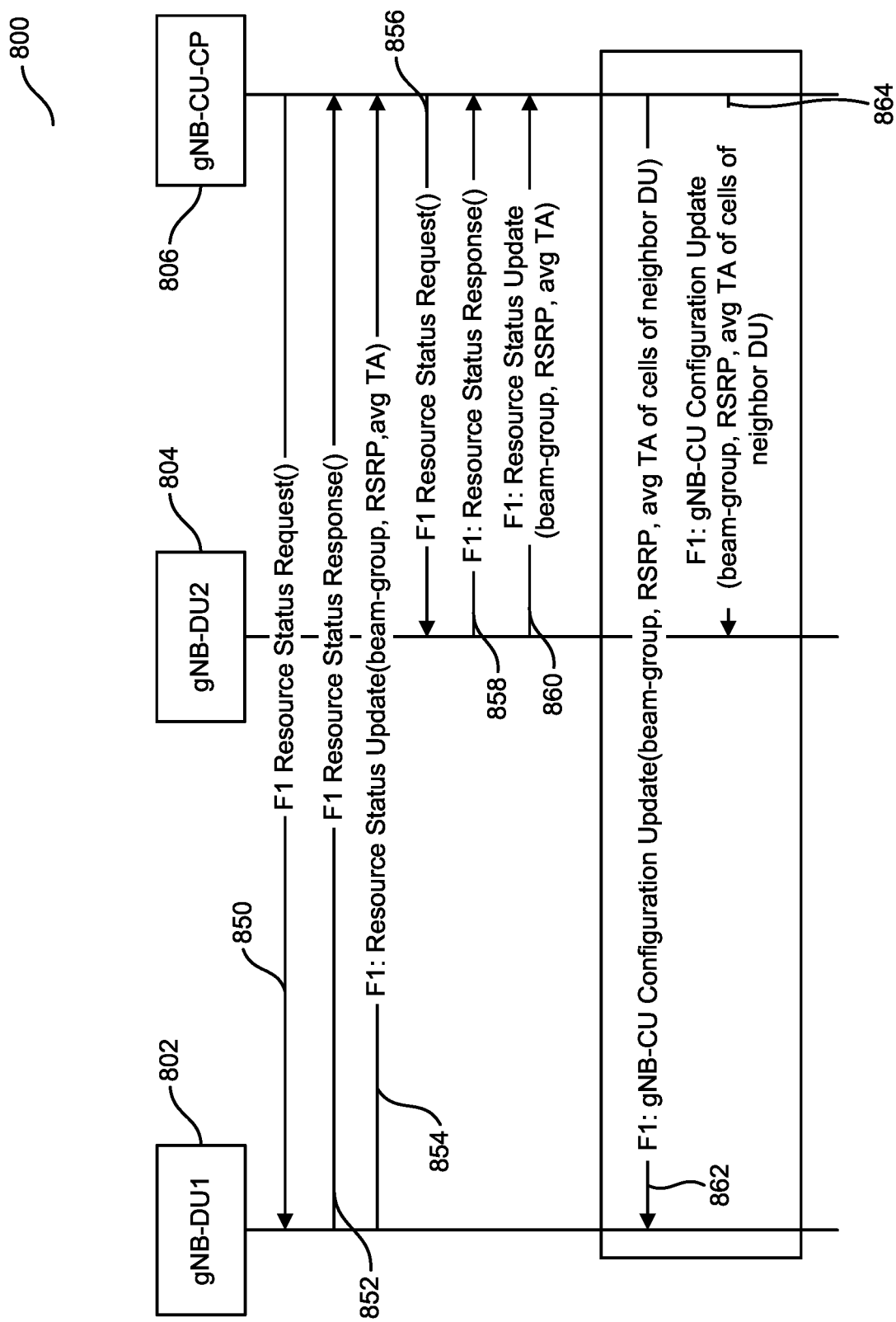
FIG. 8d illustrates still another exemplary signalling diagram, according to some implementations of the current subject matter.

In some implementations, such as that illustrated in FIGS. 7e and 8d, in which the CU-CP 806 receives data relevant to HO after F1 setup and prior to the CU-CP 806 receiving notification 708 that a serving cell change is needed for the UE, the data relevant to HO received by the CU-CP 806 includes timing advance information for a DU's one or more beams or beam groups. The timing advance information can be an average timing advance value used by UEs in each beam or beam-group for a given reference signal received power (RSRP) value or RSRP range. The data provided to the CU-CP 806 can therefore also include the RSRP value or range and the beam or beam group associated with a given average TA value. The CU-CP 806 can use the received average TA information to determine the feasibility of ICBM at a target DU cell. The DU that provides the average TA value can be configured to calculate the average TA so as to have such information available to provide to the CU-CP 806.

As shown in FIGS. 7e and 8d, the CU-CP 806 can transmit 742, 850 to the first DU 802 a request for data relevant to HO that includes average TA, RSRP, and beam or beam-group. In response to receipt of the request from the CU-CP 806, the first DU 802 transmits 852 a response to the CU-CP 806 acknowledging the request and transmits 854 to the CU-CP 806 the requested data relevant to HO that includes average TA, RSRP, and beam or beam-group. As shown in FIG. 8d, the request can be an F1 Resource Status Request message, the response acknowledgement can be an F1 Resource Status Response message, and the requested data can be transmitted 854 in an F1 Resource Status Update message. The CU-CP 806 can also transmit 744, 856 to the second DU 804 a request for data relevant to HO that includes average TA, RSRP, and beam or beam-group. In response to receipt of the request from the CU-CP 806, the second DU 804 transmits 858 a response to the CU-CP 806 acknowledging the request and transmits 860 to the CU-CP 806 the requested data relevant to HO that includes average TA, RSRP, and beam or beam-group. As shown in FIG. 8d, the request can be an F1 Resource Status Request message, the response acknowledgement can be an F1 Resource Status Response message, and the requested data can be transmitted 860 in an F1 Resource Status Update message. FIG. 8d shows the CU-CP 806 requesting the data from the first DU 802 before the second DU 804, but the CU-CP 806 can request data from the second DU 804 before the first DU 802. Also, FIG. 8d illustrates the first and second DUs 802, 804 each transmitting the average TA, RSRP, and beam or beam-group to the CU-CP 806 in a Resource Status Update message via the previously set up 702, 704 F1 communications interfaces. However, the first and second DUs 802, 804 can each transmit the average TA, RSRP, and beam or beam-group to the CU-CP 806 in another non-UE associated message, such as in a gNB-DU configuration update message. Additionally, the RSRP values transmitted 742, 744, 854, 860 can be categorized into small ranges to reduce implementation complexity.

The average TA, RSRP, and beam or beam-group can be transmitted 742, 744, 854, 860 periodically from a DU to the CU-CP 806. Alternatively, the CU-CP 806 can request 850 the average TA, RSRP, and beam or beam-group information from the serving DU 802 whenever inter-DU LTM target cells are being prepared.

In some implementations, as shown in FIG. 8d, the CU-CP 806 can provide the RSRP, beam or beam-group, and average TA information received from one DU to each of the base station's other DUs. Each DU can thus be aware of the average TA of beams/beam-groups of other DUs and therefore be aware whether ICBM is feasible, e.g., whether ICBM can be configured for a UE in a given target cell. The UE providing an RSRP for a target cell having a given timing advance value at the serving cell can be compared against the information received from the target DU 804 to determine if ICBM is feasible in the target DU cell. As shown in FIG. 8d, the CU-CP 806 can transmit 862 RSRP, beam or beam-group, and average TA information for the one or more beams or beam groups of the second DU 804 to the first DU 802, e.g., in an F1 gNB-CU Configuration Update message, and can transmit 864 RSRP, beam or beam-group, and average TA information for the one or more beams or beam groups of the first DU 802 to the second DU 804, e.g., in an F1 gNB-CU Configuration Update message. FIG. 8d shows the CU-CP transmitting 862 average TA information to the first DU 802 before transmitting 864 average TA information to the second DU 804, but average TA information can be transmitted 864 to the second DU 804 before average TA information is transmitted 862 to the first DU 802.

Referring again to FIG. 7a, in response to receiving the request from the CU-CP 808, e.g., in response to receiving the UE Context Setup Request message from the CU-CP 808, the target DU 804 prepares 712 each of the at least one target cells for LTM. In this illustrated implementation the at least one target cell includes only the target DU 804 preparing one target cell.

The target DU 804 notifies the CU-CP 806 that the preparation has been completed. The notification to the CU-CP 806 can include the target DU 804 transmitting a UE Context Setup Response message to the CU-CP 806, in accordance with 3GPP standards, using the previously set up 704 F1 communication interface.

In some implementations, the CU-CP 806 requesting the target DU 804 to prepare at least one target cell can include the CU-CP 806 transmitting an indication of the target cell configuration being at least one of ICBM, dynamic switching, and LTM SCC. The CU-CP 806 previously receiving at least one resource availability report from the second DU 804, e.g., as discussed above with respect to FIGS. 7d and 8c, may allow the CU-CP 806 to indicate the target cell configuration as the at least one of ICBM, dynamic switching, and LTM SCC with a higher chance of success than without any such resource availability reporting because, at least as of the most recently received resource availability report, the second DU 804 is known by the CU-CP 806 to have the indicated one or more ICBM, dynamic switching, and LTM SCC of available.

FIG. 8c illustrates an implementation in which the request to the second DU 804 includes the CU-CP 806 indicating a target cell configuration to the second DU 804. As shown in FIG. 8c, the target cell configuration can be transmitted 846 to the second DU 804 in the UE Context Setup Request message. FIG. 8c also shows the second DU 804 transmitting 848 the UE Context Setup Response message to the CU-CP 806.

Referring again to FIG. 7a, the CU-CP 806 notifies 714 the serving DU 804 of at least one LTM-prepared target cell by identifying each of the one or more LTM-prepared target cells and including information about each of the one or more target DUs. In an inter-DU LTM scenario, one or more of the at least one LTM-prepared target cells belong to a different DU than the serving DU 802. For example, with reference to the system of FIG. 6b, the serving DU can be a small cell 626 of macro1 DU 628a, and one or more of the target cells can be one or more small cells 626 of macro2 DU 628b and/or macro3 DU 628c.

The notification 714 to the serving DU 802 can include the CU-CP 806 transmitting a UE Context Modification Request message to the serving DU 802 using the previously set up 702 F1 communication interface. The UE Context Modification Request message can include for each of the one or more target DUs cell identification information (e.g., a unique cell ID that identifies the target DU such as a physical cell identifier (PCI)) or an index corresponding to cell ID.

In response to being notified 714 of the at least one LTM prepared target DU cell, the serving DU 802 stores the received information regarding the at least one LTM target cell, e.g., stores a list of the LTM-prepared target cell(s). Also in response to being notified 714 of the at least one target DU 804, the serving DU 802 can transmit a UE Context Modification Response message to the CU-CP 806 using the previously set up 702 F1 communication interface. The UE Context Modification Response message can include consolidated cell group configuration information for each of the one or more target cells identified to the UE by the CU-CP 806. The UE Context Modification Request message and the UE Context Modification Response message are each defined by 3GPP. The serving DU 802 can thus receive information regarding the at least one target cell from the CU-CP 806, and can acknowledge the receipt to the CU-CP 806, using messages already transmitted for HO in accordance with 3GPP standards.

In some implementations, the notification 714 to the serving DU 802 can include the CU-CP 806 indicating a target cell configuration to the serving DU 802. As mentioned above, the indication of target cell configuration can be at least one of ICBM, dynamic switching, and LTM SCC. For example, the indicated target cell configuration can be ICBM. For another example, the indicated target cell configuration can be dynamic switching. For yet another example, the indicated target cell configuration can be LTM SCC. For still another example, the indicated target cell configuration can be ICBM and dynamic switching. For another example, the indicated target cell configuration can be LLM SCC and dynamic switching.

FIG. 8c illustrates an implementation in which the notification 714 to the serving DU 802 includes the CU-CP 806 indicating a target cell configuration to the serving DU 802. As shown in FIG. 8c, the target cell configuration can be transmitted 842 to the serving DU 802 in the UE Context Modification Request message. FIG. 8c also shows the serving DU 802 transmitting 842 the UE Context Modification Response message to the CU-CP 806.

Referring again to FIG. 7a, in response to receiving the UE Context Modification Response message, the CU-CP 806 can transmit an RRC reconfiguration message to the UE, in accordance with 3GPP standards. The RRC reconfiguration message includes LTM target cell configuration information, e.g., as provided to the CU-CP 806 from the target DU 804 in the transmitted UE Context Setup Response message.

In response to receiving the target cell configurations in the RRC reconfiguration message, the UE can transmit an L1 measurement report to the serving DU 802, in accordance with 3GPP standards. The L1 measurement report provides the UE measured radio condition information of the configured target cells to the serving DU 802.

In response to receiving the L1 measurement report transmitted from the UE, the serving cell 802 selects 716 a target cell, from among the one or more LTM-prepared target cells identified to the serving DU 802. In this illustrated implementation there is only one target cell (the target DU 804) identified to the serving DU 802 by the CU-CP 806 as an LTM-prepared target cell, so the serving cell's selection 716 is straightforward, with the serving DU 802 selecting 716 the target DU 806. If there are multiple LTM-prepared target cells which satisfy the handover criteria at the serving DU 802, the serving DU 802 can select the target cell in any of a variety of ways, including selection according to traditional procedure in accordance with 3GPP.

In implementations in which there are a plurality of target cells identified to the serving DU 802 by the CU-CP 806, the serving cell's target cell selection 716 can include determining which one or more of the plurality of target cells has a radio quality above a predetermined threshold radio quality. The predetermined threshold radio quality is defined by the UE's radio condition that the serving DU 802 received from the UE in the L1 measurement report. The serving DU 802 can thus take into consideration particular needs of the particular UE involved in the HO when selecting 716 a target cell for the HO. Additionally, the L1 measurement report transmitted by the UE to the serving DU 802 reports L1 measurements, which can include reference signal received power (RSRP) as defined by 3GPP, for each of the plurality of target cells, whose identities are known by the UE as having been provided to the UE by the CU-CP 806 in the RRC reconfiguration message. The serving DU 802 can therefore analyze the L1 measurement report received from the UE to determine which one or more of the plurality of target cells has a radio quality above a predetermined threshold radio quality.

If only one of the plurality of target cells satisfies the UE's radio condition, e.g., only one of the target cells' radio qualities is above the predetermined threshold radio quality, then the serving cell 802 selects 716 that target cell. If more than one of the plurality of target cells satisfies the UE's radio condition, e.g., the target cells' radio qualities are each above the predetermined threshold radio quality, then any one of these target cells would be able to serve the UE's needs and one of these target cells can be selected at random or according to another desired criteria.

Having selected 716 the target cell (e.g., the target DU 804 in the illustrated implementation of FIG. 8a), the serving DU 802 triggers 718 serving cell change to the selected 716 target cell. Triggering 718 the serving cell change can include the serving DU 802 transmitting a MAC CE to the UE that includes a serving cell change command and identifies, e.g., by PCI or other identifier, the selected 716 target cell to the UE.

The UE's receipt of the MAC CE indicates to the UE that LTM serving cell change (SCC) has to be performed to the identified target cell, e.g., the target DU 804 in the illustrated implementation of FIGS. 8a-8d, for the UE. Thus, in response to receiving the MAC CE from the serving cell 802, the UE begins 720 HO to the target cell. The HO can be performed in accordance with 3GPP standards. In response to the UE accessing the target cell, the target DU 804 can transmit a serving cell change notification to the CU-CP 806, via the previously set up 704 F1 communications interface, that identifies the target DU 804, e.g., by unique identifier per 3GPP, as the new, current serving cell for the UE for at least one service. Also in response to receiving the MAC CE from the serving cell 802, the UE can transmit an RRC reconfiguration acknowledgment message to the CU-CP 806. The CU-CP 806 therefore receives acknowledgment from both the UE, via the RRC reconfiguration acknowledgment message indicating a successful RRC reconfiguration at the UE, and the target DU 804, via the serving cell change notification, that the target DU 804 is now serving the UE for at least one service that has been handed over from the serving DU 802.

In some implementations, such as various implementations discussed above with respect to FIGS. 7a-8d, a CU-CP receives from a DU data relevant to a HO of at least one service for a UE. In other implementations, DUs of a base station can share their TA information with each other directly such that a first DU receives from at least one other DU data relevant to a HO of at least one service for a UE. Such DU-to-DU communication is not possible in a 5G wireless communications system but may be possible in a 6G or later wireless communications system. In implementations in which the first DU receives the data from at least one other DU, the first DU can perform similar to that discussed above with respect to the CU-CP 806 of FIGS. 7a-8d and requesting one or more of the at least one other DUs to prepare, considering the data, at least one LTM target cell for the HO of the at least one service for the UE.

Using the implementation of FIGS. 7b and 8a by way of example for implementations in which DU-to-DU communication is possible, instead of the first DU 802 transmitting TA information of all the beams/beam-groups for each cell of the first DU 802 to the CU-CP 806, the first DU 802 transmits the TA information to the second DU 804, and instead of the second DU 804 transmitting TA information of all the beams/beam-groups for each cell of the second DU 804 to the CU-CP 806, the first DU 802 transmits the TA information to the first DU 802. Additionally, instead of the CU-CP 806 selecting a configuration and requesting the second DU 804 to prepare at least one target cell in accordance with the selected configuration, the first DU 802 would perform such selecting and requesting. The DU-to-DU transmission of TA information would not occur during setup of an F1 communication interface because, as discussed above, an F1 communications interface is for CU-DU communications. Instead, the DU-to-DU transmission of TA information can occur during setup of a communication interface between the first DU 802 and the second DU 804 as appropriate and in accordance with standards relevant to the wireless communications system in which the first and second DUs 802, 804 are configured to communicate.

Figure 9:
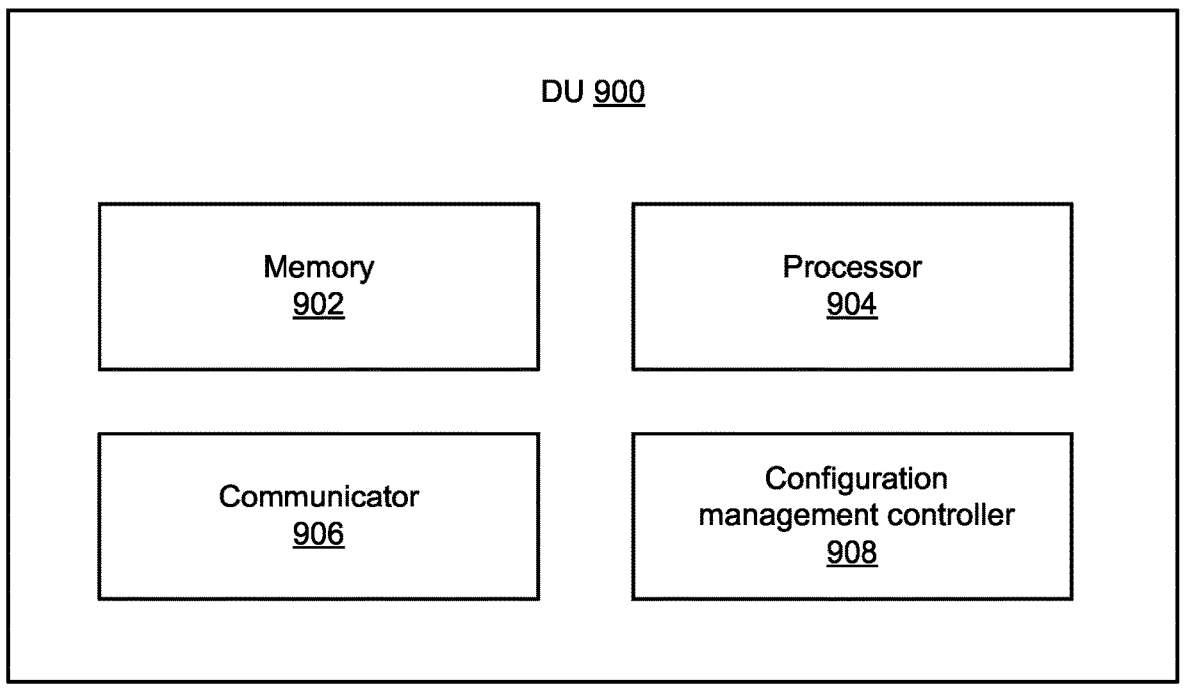
FIG. 9 illustrates an exemplary architecture of a distributed unit (DU) in the signalling diagrams of FIGS. 8a-8d, according to some implementations of the current subject matter.

FIG. 9 illustrates an exemplary architecture of a DU 900 that can be used as an architecture for the DUs 802, 804 of FIGS. 8a-8d. As shown in FIG. 9, the DU 900 includes a memory 902, a processor 904, a communicator 906, and a configuration management controller 908. The communicator 906 is configured to communicate internally between internal hardware components of the DU 900 and with external devices via one or more networks. The communicator 906 can include an electronic circuit specific to a standard that enables wired or wireless communication. The configuration management controller 908 is configured to perform the configuration selection discussed above, and the memory 902 is configured to store the configuration therein. Multiple configurations can be stored in the memory 902, one configuration per UE such that the DU 900 maintains configurations for multiple UEs. Although FIG. 9 shows hardware components of the DU 900, other implementations of the DU 900 are possible. For example, the DU 900 may include less or a greater number of components. One or more components can be combined together to perform same or substantially similar technical features for latency management.

Figure 10:
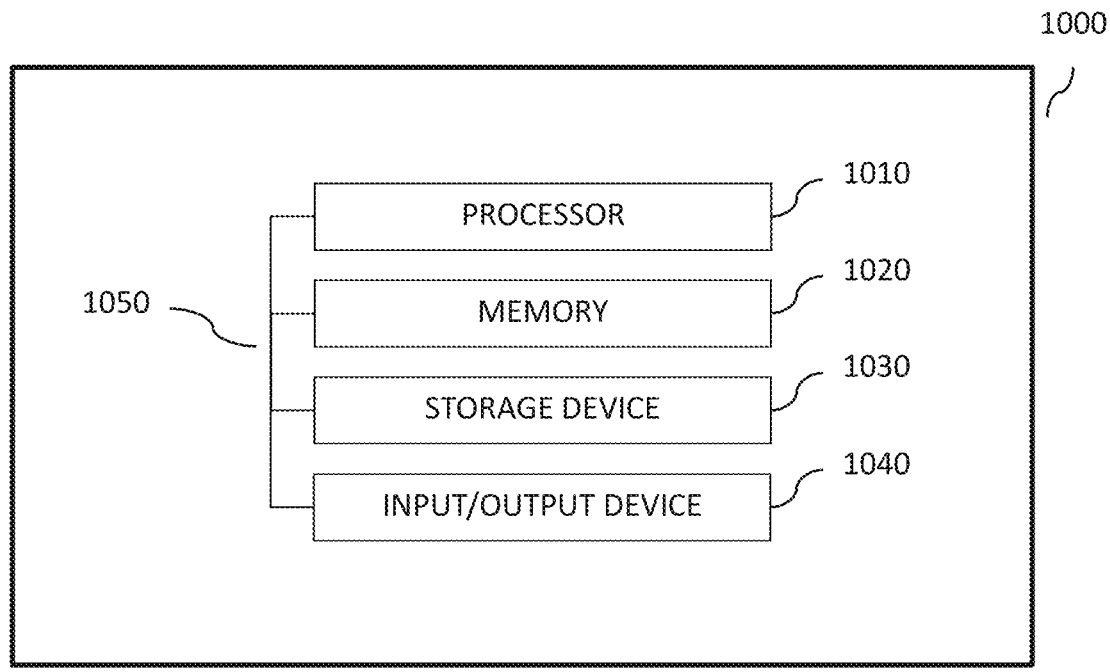
FIG. 10 illustrates an exemplary system, according to some implementations of the current subject matter.

In some implementations, the current subject matter can be configured to be implemented in a system 1000, as shown in FIG. 10. The system 1000 can include one or more of a processor 1010, a memory 1020, a storage device 1030, and an input/output device 1040. Each of the components 1010, 1020, 1030 and 1040 can be interconnected using a system bus 1050. The processor 1010 can be configured to process instructions for execution within the system 600. In some implementations, the processor 1010 can be a single-threaded processor. In alternate implementations, the processor 1010 can be a multi-threaded processor. The processor 1010 can be further configured to process instructions stored in the memory 1020 or on the storage device 1030, including receiving or sending information through the input/output device 1040. The memory 1020 can store information within the system 1000. In some implementations, the memory 1020 can be a computer-readable medium. In alternate implementations, the memory 1020 can be a volatile memory unit. In yet some implementations, the memory 1020 can be a non-volatile memory unit. The storage device 1030 can be capable of providing mass storage for the system 1000. In some implementations, the storage device 1030 can be a computer-readable medium. In alternate implementations, the storage device 1030 can be a floppy disk device, a hard disk device, an optical disk device, a tape device, non-volatile solid state memory, or any other type of storage device. The input/output device 1040 can be configured to provide input/output operations for the system 1000. In some implementations, the input/output device 1040 can include a keyboard and/or pointing device. In alternate implementations, the input/output device 1040 can include a display unit for displaying graphical user interfaces.

Figure 11:
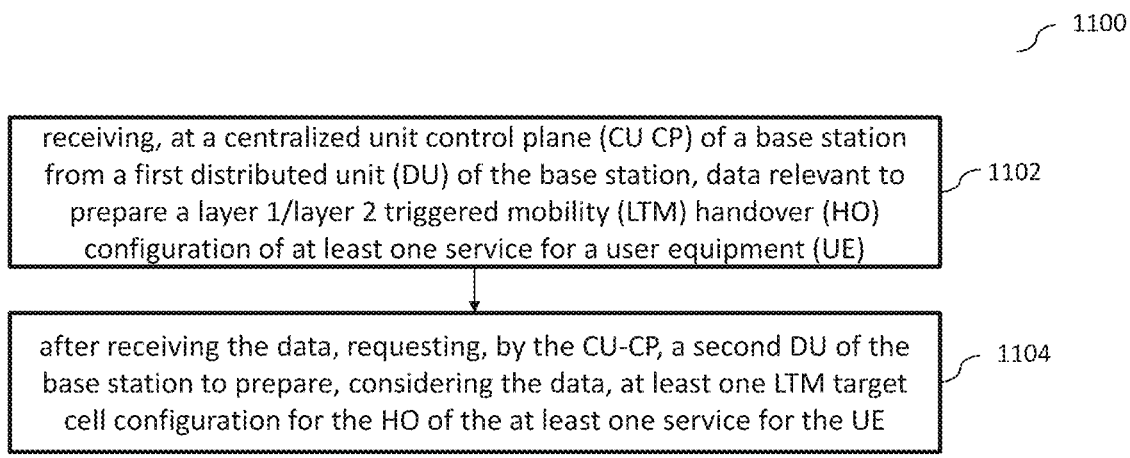
FIG. 11 illustrates an exemplary method, according to some implementations of the current subject matter.

FIG. 11 illustrates an exemplary method 1100 for configuration selection enhancements for LTM, according to some implementations of the current subject matter. The method 1100 may be performed, for example, using implementations shown in and described with respect to FIGS. 6a-9.

The method 1100 includes receiving 1102, at a CU-CP of a base station from a first DU of the base station, data relevant to prepare a LTM HO configuration of at least one service for a UE. The method also includes, after receiving the data, requesting 1104, by the CU-CP, a second DU of the base station to prepare, considering the data, at least one LTM target cell configuration for the HO of the at least one service for the UE.

In some implementations, the current subject matter can include one or more of the following optional features.

In some implementations, the data can include timing advance information for each of a plurality of cells of the DU. Further, the CU-CP can receive the data in a procedure setting up an F1 communication interface between the CU-CP and the first DU, and/or the CU-CP can receive the data in an F1 Setup Request message transmitted from the first DU to the CU-CP; or the timing advance information can include average timing advance information for a given reference signal received power (RSRP) value for each of a plurality of beams or beam-groups of a plurality of cells of the second DU, and the CU-CP can receive the average timing advance information from the first DU prior to the CU-CP receiving a message from the first DU that a service change is needed for the UE, and/or the CU-CP can receive the data periodically in a non-UE associated procedure between the CU-CP and the second DU.

In some implementations, the receiving 1102 can include the CU-CP periodically receiving the data from the first DU prior to the CU-CP receiving a message from the first DU that a service change is needed for the UE, and the method can also include framing, at the CU-CP and using machine learning, a HO policy based at least in part on the received data. Further, the data can include data regarding of at least one of a type of the UE, a speed of the UE, at least one service accessed at the first DU by the UE, and dynamic switching between a first cell and a second cell; and/or the method can also include receiving, at the CU-CP from the first DU currently serving the UE for the at least one service, performance data regarding the first DU's service to the UE, and the requesting can request the second DU to prepare the at least one LTM target cell also considering the data received from the first DU.

In some implementations, the first DU can includes at least one cell, the data can include resource availability of the at least one cell, and the receiving can include the CU-CP periodically receiving the resource availability from the first DU prior to the CU-CP receiving a message from the first DU currently serving the UE for the at least one service that a service change is needed for the UE; and/or the resource availability can include availability at each of the at least one cells for inter cell beam management (ICBM), dynamic switching, multiple transmission and reception point (mTRP), and LTM serving cell change (SCC).

In some implementations, the requesting 1104 can include transmitting, from the CU-CP to the second DU, an indication of target cell configuration being at least one of ICBM, dynamic switching, and LTM SCC.

In some implementations, the CU-CP can receive the data from the first DU prior to the CU-CP receiving a message from the first DU currently serving the UE for the at least one service that a service change is needed for the UE.

In some implementations, the method 1100 can also include selecting, at the CU-CP, a target cell configuration based at least in part on the received data.

In some implementations, the base station can have a disaggregated architecture.

In some implementations, the base station can include an NG-RAN node that includes a gNodeB or an ng-eNodeB.

In some implementations, the base station can include at least one processor and can include at least one non-transitory storage media storing instructions that, when executed by the at least one processor, cause the at least one processor to perform the method 1100.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. An apparatus, comprising:
    at least one processor; and
    at least one non-transitory storage media storing instructions that, when executed by the at least one processor, cause the at least one processor to perform operations comprising:
        receiving, at a centralized unit control plane (CU-CP) of a base station from a first distributed unit (DU) of the base station, data relevant to prepare a layer 1/layer 2 triggered mobility (LTM) handover (HO) configuration of at least one service for a user equipment (UE), and
        after receiving the data, requesting, by the CU-CP, a second DU of the base station to prepare, considering the data, at least one LTM target cell configuration for the HO of the at least one service for the UE.

2. The apparatus of claim 1, wherein the data includes timing advance information for each of a plurality of cells of the second DU.

3. The apparatus of claim 2, wherein the CU-CP receives the data in a procedure setting up an F1 communication interface between the CU-CP and the first DU.

4. The apparatus of claim 3, wherein the CU-CP receives the data in an F1 Setup Request message transmitted from the first DU to the CU-CP.

5. The apparatus of claim 2, wherein the timing advance information includes average timing advance information for a given reference signal received power (RSRP) value for each of a plurality of beams or beam-groups of a plurality of cells of the second DU; and
    the CU-CP receives the average timing advance information from the first DU prior to the CU-CP receiving a message from the first DU that a service change is needed for the UE.

6. The apparatus of claim 5, wherein the CU-CP receives the data periodically in a non-UE associated procedure between the CU-CP and the first DU.

7. The apparatus of claim 1, wherein the receiving includes the CU-CP periodically receiving the data from the first DU prior to the CU-CP receiving a message from the first DU that a service change is needed for the UE; and
    the operations further comprise framing, at the CU-CP and using machine learning, a HO policy based at least in part on the received data.

8. The apparatus of claim 7, wherein the data includes data regarding of at least one of:
    a type of the UE,
    a speed of the UE,
    at least one service accessed at the first DU by the UE, and
    dynamic switching between a first cell and a second cell.

9. The apparatus of claim 7, wherein the operations further comprise receiving, at the CU-CP from the first DU currently serving the UE for the at least one service, performance data regarding the first DU's service to the UE; and
    the requesting requests the second DU to prepare the at least one LTM target cell also considering the data received from the first DU.

10. The apparatus of claim 1, wherein the first DU includes at least one cell;
    the data includes resource availability of the at least one cell; and
    the receiving includes the CU-CP periodically receiving the resource availability from the first DU prior to the CU-CP receiving a message from the first DU currently serving the UE for the at least one service that a service change is needed for the UE.

11. The apparatus of claim 10, wherein the resource availability includes availability at each of the at least one cells for inter cell beam management (ICBM), LTM serving cell change (SCC) with dynamic switching, multiple transmission and reception point (mTRP), and LTM SCC.

12. The apparatus of claim 1, wherein the requesting includes transmitting, from the CU-CP to the second DU, an indication of target cell configuration being at least one of inter cell beam management (ICBM), LTM serving cell change (SCC) with dynamic switching, and LTM SCC.

13. The apparatus of claim 1, wherein the CU-CP receives the data from the first DU prior to the CU-CP receiving a message from the first DU currently serving the UE for the at least one service that a service change is needed for the UE.

14. The apparatus of claim 1, wherein the operations further comprise selecting, at the CU-CP, a target cell configuration based at least in part on the received data.

15. The apparatus of claim 1, wherein the base station has a disaggregated architecture.

16. The apparatus of claim 1, wherein the base station includes a Next Generation Radio Access network (NG-RAN) node that includes a gNodeB or an ng-eNodeB.

17. The apparatus of claim 1, wherein the base station includes the at least one processor and the at least one non-transitory storage media.

18. At least one non-transitory storage media storing instructions that, when executed by at least one processor, cause the at least one processor to perform operations comprising:
    receiving, at a centralized unit control plane (CU-CP) of a base station from a first distributed unit (DU) of the base station, data relevant to prepare a layer 1/layer 2 triggered mobility (LTM) handover (HO) configuration of at least one service for a user equipment (UE), and
    after receiving the data, requesting, by the CU-CP, a second DU of the base station to prepare, considering the data, at least one LTM target cell configuration for the HO of the at least one service for the UE.

19. A computer-implemented method, comprising:
    receiving, at a centralized unit control plane (CU-CP) of a base station from a first distributed unit (DU) of the base station, data relevant to prepare a layer 1/layer 2 triggered mobility (LTM) handover (HO) configuration of at least one service for a user equipment (UE), and
    after receiving the data, requesting, by the CU-CP, a second DU of the base station to prepare, considering the data, at least one LTM target cell configuration for the HO of the at least one service for the UE.

\* \* \* \* \*